United States Patent
White et al.

(10) Patent No.: US 7,554,550 B2
(45) Date of Patent: Jun. 30, 2009

(54) NON-DESTRUCTIVE PROCESSING OF DIGITAL IMAGE DATA

(75) Inventors: Steven James White, Seattle, WA (US); Donald M. Marsh, Bellevue, WA (US); Tomasz S. M. Kasperkiewicz, Redmond, WA (US); Mahmood Gulam Qadir, Redmond, WA (US); David R. Blythe, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 158 days.

(21) Appl. No.: 11/166,325

(22) Filed: Jun. 24, 2005

(65) Prior Publication Data

US 2006/0290703 A1    Dec. 28, 2006

(51) Int. Cl.
G06F 17/00 (2006.01)
G06F 13/14 (2006.01)
G06F 17/50 (2006.01)
G06F 7/60 (2006.01)
G06F 7/48 (2006.01)
G06T 1/60 (2006.01)
G06T 15/00 (2006.01)
G09G 5/39 (2006.01)

(52) U.S. Cl. ............... 345/519; 345/418; 345/419; 345/531; 703/2; 703/6; 703/7

(58) Field of Classification Search ............... 345/505, 345/506, 519, 522, 526, 418, 419, 531; 395/133, 395/135, 152, 153, 154, 155, 160, 161, 501, 395/502, 505, 506, 519, 526; 703/2, 6, 7; 715/500.1
See application file for complete search history.

(56) References Cited

U.S. PATENT DOCUMENTS

| | | | | |
|---|---|---|---|---|
| 5,642,475 A * | 6/1997 | Itoh et al. | ............... | 345/645 |
| 5,644,364 A | 7/1997 | Kurtze et al. | | |
| 5,777,629 A * | 7/1998 | Baldwin | ............... | 345/506 |
| 6,357,047 B1 | 3/2002 | Kurtze et al. | | |
| 6,373,492 B1 | 4/2002 | Kroitor | | |
| 6,429,860 B1 | 8/2002 | Hughes | | |
| 6,487,565 B1 | 11/2002 | Schechter et al. | | |
| 6,646,642 B1 * | 11/2003 | Kanetaka et al. | ............... | 345/473 |
| 6,700,579 B2 | 3/2004 | Gould | | |
| 6,778,948 B1 * | 8/2004 | Kanetaka et al. | ............... | 703/22 |
| 7,050,955 B1 | 5/2006 | Carmel et al. | | |
| 7,142,709 B2 * | 11/2006 | Girard | ............... | 382/154 |

(Continued)

OTHER PUBLICATIONS

JASC Software Inc., Paint Shop Pro Users Guide, Copyright 2003, All Pages.*

(Continued)

*Primary Examiner*—Xiao M Wu
*Assistant Examiner*—Aaron M Guertin
(74) *Attorney, Agent, or Firm*—Shook, Hardy & Bacon LLP

(57) ABSTRACT

Systems for rendering Effect graphs for non-destructively processing digital image data which integrate Central Processing Unit (CPU) processing and Graphics Processing Unit (GPU) processing are provided. Additionally provided are systems for processing digital image data utilizing Effect graphs. The systems of the present invention integrate CPU processing and GPU processing to facilitate accelerated rendering of Effect graphs and, consequently, accelerated processing of digital images. Methods for processing digital image data utilizing the systems herein described are also provided.

19 Claims, 15 Drawing Sheets

U.S. PATENT DOCUMENTS

| | | | |
|---|---|---|---|
| 2002/0109682 A1* | 8/2002 | Nash et al. | 345/418 |
| 2002/0158864 A1 | 10/2002 | Matichuk | |
| 2003/0033424 A1 | 2/2003 | Gould | |
| 2004/0051716 A1* | 3/2004 | Sevigny | 345/589 |
| 2005/0231502 A1 | 10/2005 | Harper et al. | |
| 2005/0237329 A1* | 10/2005 | Rubinstein et al. | 345/531 |

OTHER PUBLICATIONS

Shantzis, "A Model for Efficient and Flexible Image Computing," International Conference on Computer Graphics and Interactive Techniques, 1994, pp. 147-154.

U.S. Appl. No. 11/166,751, filed Jun. 24, 2005; USPTO Office Action Mailed Aug. 20, 2007.

U.S. Appl. No. 11/166,761, filed Jun. 24, 2005; USPTO Office Action Mailed Aug. 22, 2007.

U.S. Appl. No. 11/166,738, filed Jun. 24, 2005; USPTO Notice of Allowance Mailed Oct. 18, 2007.

U.S. Appl. No. 11/166,021, filed Jun. 24, 2005; USPTO Notice of Allowance Mailed Aug. 16, 2007.

Lehman et al., "Logic Decomposition During Technology Mapping", IEEE, vol. 16, No. 8, Aug. 1997, pp. 813-834.

PCT/US06/21996 International Search Report, Date Mailed: Aug. 28, 2007, White, et al.

U.S. Appl. No. 11/166,761, filed Jun. 24, 2005; USPTO Final Office Action Mailed Feb. 20, 2008.

U.S. Appl. No. 11/166,751, filed Jun. 24, 2005; USPTO Non-Final Office Action Mailed Feb. 20, 2008.

U.S. Appl. No. 11/166,738, filed Jun. 24, 2005; USPTO Non-Final Office Action Mailed Feb. 5, 2008.

\* cited by examiner

NON-DESTRUCTIVE PROCESSING OF DIGITAL IMAGE DATA

CROSS-REFERENCE TO RELATED APPLICATIONS

The subject matter of this application is related to the subject matter of U.S. patent application Ser. No. 11/166,761 filed Jun. 24, 2005, entitled "Performing a Pre-Rendering Pass in Digital Image Processing", U.S. patent application Ser. No. 11/166,751 filed Jun. 24, 2005, entitled "Caching Digital Image Data", U.S. patent application Ser. No. 11/166,738 filed Jun. 24, 2005, entitled "Accumulating Transforms Through an Effect Graph in Digital Image Processing", and U.S. patent application Ser. No. 11/166,021 filed Jun. 24, 2005, entitled "Translating Layers into Effect Graphs in Digital Image Processing", each of which is assigned or under obligation of assignment to the same entity as this application, and incorporated in this application by reference.

STATEMENT REGARDING FEDERALLY SPONSORED RESEARCH OR DEVELOPMENT

Not Applicable.

BACKGROUND

Video Cards or Graphics Processing Units (GPUs) differ from Central Processing Units (CPUs) in that they utilize very high speed memory and couple it with a specialized processor that is capable of handling simple calculations on pixel data very efficiently. Video cards are not general purpose processors. However, they can compute, for instance, which surfaces should be visible to a user and which should be hidden as well as what textures should be mapped onto those surfaces to make them look realistic in a three-dimensional (3D) scene much more rapidly than a CPU could accomplish the same task. This is largely due to the fact that while CPUs can adequately perform a variety of general tasks, they are not optimized for any particular operation whereas video cards utilize very specialized hardware to perform only a single function at a time.

Video Cards (GPUs) have traditionally been used for two primary purposes. First, GPUs have been utilized to accelerate simple graphics operations on a user's screen. For instance, when a user scrolls through a document displayed on a display device (e.g., a conventional computer monitor), a large number of pixels are moved around. Due to the computational demand such action places, traditional CPUs are not exceptionally rapid or efficient at accomplishing this task. As such, a GPU may be utilized in conjunction with the CPU to achieve more rapid and efficient scrolling.

Secondly, GPUs have been utilized to render simple primitives (e.g., to fill an area with a color, draw a line, or the like). As with acceleration of simple graphics operations, GPUs can more rapidly and efficiently render such simple primitives than traditional CPUs.

More recently, video games have started to become more popular causing the demand for increased realism and speed in such games to increase. As such, video game manufacturers have begun to tackle complex issues of video rendering, for example, rendering a three-dimensional scene while providing shading, reflections, texture mapping, and the like to make the scene look as realistic as possible while still rapidly responding to user input.

Outside of the particular areas mentioned above, video cards have not been utilized to accelerate CPU functions. Use of digital images in arenas outside of video game manufacture has also enjoyed a recent increase. However, as digital images get bigger (more megapixels) and pixels get deeper (at least 16 bits per channel), they are straining the computational resources available in traditional CPUs resulting in slower, less efficient digital image processing.

SUMMARY

The present invention relates to non-destructive editing of digital image data utilizing, at least in part, Graphics Processing Unit (GPU) memory. Non-destructive editing (or non-destructive processing) refers to editing (or processing) wherein only that image data for which rendering is requested will be rendered at the time of the request. In other words, rendering takes place beginning from unaltered originally-loaded image data on-demand whenever an image is rendered. Non-destructive editing utilizing GPU memory permits the loading, into the GPU, of only the bits needed for rendering on-demand. As such, significantly higher performance rendering is permitted relative to traditional editing models that utilize only Central Processing Unit (CPU) memory.

BRIEF DESCRIPTION OF THE SEVERAL VIEWS OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems and methods for processing digital image data utilizing Effect graphs. Having briefly described an overview of the present invention, an exemplary operating environment for the present invention is described below.

Figure 1:
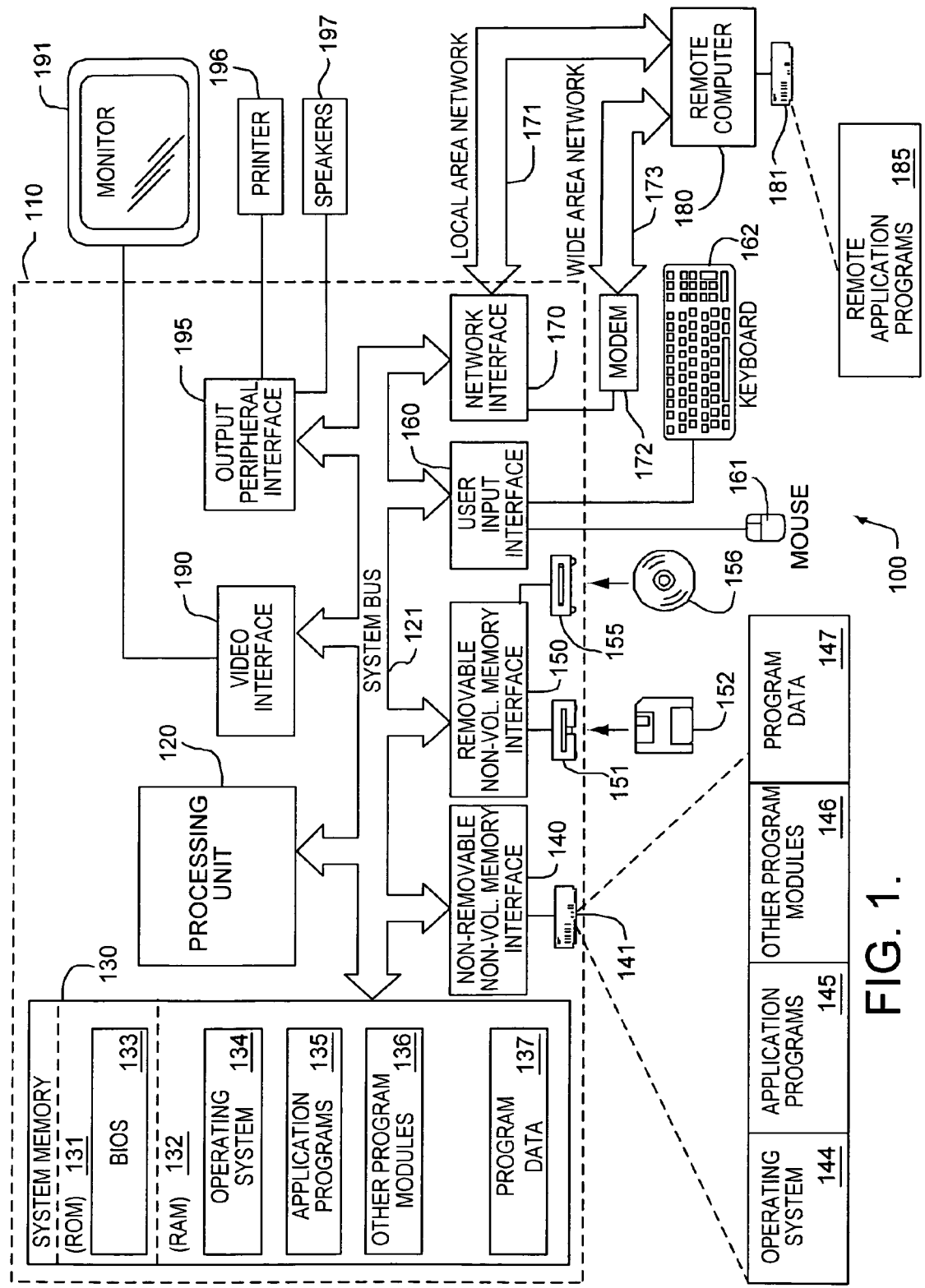
FIG. 1 is a block diagram of an exemplary computing environment suitable for use in implementing the present invention.

Referring to the drawings in general and initially to FIG. 1 in particular, wherein like reference numerals identify like components in the various figures, an exemplary operating environment for implementing the present invention is shown and designated generally as computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the present invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVDs), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other programs 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in a remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

When the computer 110 is turned on or reset, the BIOS 133, which is stored in the ROM 131, instructs the processing unit 120 to load the operating system, or necessary portion thereof, from the hard disk drive 141 into the RAM 132. Once the copied portion of the operating system, designated as operating system 144, is loaded in RAM 132, the processing unit 120 executes the operating system code and causes the visual elements associated with the user interface of the operating system 134 to be displayed on the monitor 191. Typically, when an application program 145 is opened by a user, the program code and relevant data are read from the hard disk drive 141 and the necessary portions are copied into RAM 132, the copied portion represented herein by reference numeral 135.

As previously mentioned, embodiments of the present invention provide systems and methods for utilizing the acceleration capabilities of a video card or GPU in digital image processing. Such methods and systems may utilize, e.g., video interface 190 of FIG. 1. It will be understood and appreciated by those of ordinary skill in the art that a "digital image", as the term is utilized herein, refers to any digital image data including a static and/or dynamic digital image and that any and all combinations or variations thereof are contemplated to be within the scope of the present invention. Utilizing the systems and methods herein described, pixel data may be transformed in a variety of ways at an accelerated pace, that is, faster than the CPU could do it itself.

Embodiments of the present invention additionally integrate non-destructive editing with GPU acceleration. "Non-destructive editing" or "non-destructive processing", as those terms are utilized herein, refer to editing (or processing) wherein only that image data for which rendering is requested will be rendered at the time of the request, that is, without flattening or saving the data to intermediate steps. In other words, rendering takes place beginning from unaltered originally-loaded image data on-demand whenever an image is rendered.

Prior applications have attempted non-destructive editing in combination with CPU processing to varying degrees. However, it has not been fully realized as CPU processing is sufficiently slow that the performance could not match that of the flattened models on the relatively small images that were prevalent at the time. More recently, however, very large (megapixel) photo images have increased in popularity making a non-destructive editing model more appealing.

Utilizing a GPU in combination with non-destructive editing, as contemplated by embodiments of the present invention, makes image processing hugely—often orders of magnitude—higher performance than traditional CPU-based flattened models. Indeed, flattened models are ill-suited for GPU implementation given the relatively small memory footprint of the GPU (flattening is very memory intensive) and limited bandwidth for reading image data from the GPU to CPU memory.

Non-destructive editing in combination with a GPU permits the loading, into the GPU, of only the bits needed for rendering on-demand. Hence, the need to ensure that all of the original pixels are processed at full resolution for each edit is avoided.

Methods and systems in accordance with embodiments of the present invention integrate GPU acceleration capabilities into a CPU digital image processing model. That is, the GPU is integrated into the digital image processing model architecture, as opposed to being provided peripherally as merely a special feature or the like. In this way, CPU and GPU processing are unified so that users (e.g., programmers or developers) who are working in digital image processing can interchangeably use the two modalities for what their strengths or capabilities are with the target device, for example, without having to choose either CPU processing or GPU processing alone.

It should be noted that while integrated into the system architecture, use of a GPU is provided as an optional component. Thus, if the rendering device includes a capable video card, the system may call on its acceleration capabilities as needed or desired. However, if the system does not include a capable video card, it may still be utilized for digital image processing.

Methods and systems of the present invention provide the functionality for creating an Effect graph and wiring it using a GPU, a CPU, or some combination of the two. The digital image processing model architecture, in accordance with embodiments of the present invention, is comprised of elements referred to herein as Effects. An Effect, as that term is utilized herein, is a basic image processing class. That is, Effects are basically pixel operators. They take in buffers and pixel data, manipulate the data, and output modified pixels. For instance, a sharpening Effect takes in image pixels, sharpens the pixel edges, and outputs an image that is sharper than the image pixels taken in. In another example, an exposure Effect takes in image pixel data, adjusts the color balance of the pixels, and outputs and image having modified color balance from what was taken in. The primary function of an Effect is thus to process pixels.

Different Effects, e.g., masking, blending, rotating, and the like, may be defined to implement a variety of image processing algorithms. As more fully described below, users are permitted to wire pre-defined Effects together to achieve a desired result. If desired, a user may also define new Effects to implement interesting image processing algorithms. Effects can process any number of input images and produce any number of output images. The number of inputs and outputs is determined at construction time and cannot be changed without recreating the Effect. The meaning of each input or output is defined by the Effect itself. In most cases, the meaning is order-dependent.

Figure 2:
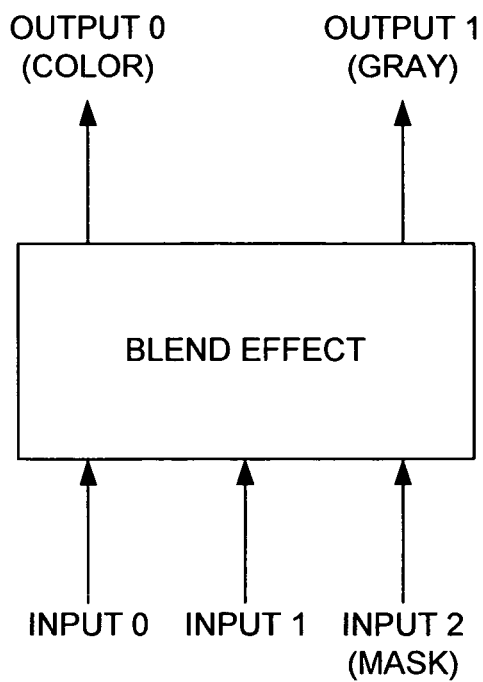
FIG. 2 is a schematic diagram of an exemplary blending Effect having three inputs and two outputs, in accordance with an embodiment of the present invention.

By way of example only, FIG. 2 illustrates a schematic diagram of a blend Effect having three inputs and two outputs. This particular blend Effect blends its first two inputs (Input 0 and Input 1), modulated by a mask supplied to its third input (Input 2). In this example, the first output (Output 0) produces a color image, while the second output (Output 1) produces an image in shades of gray. Many Effects produce only one output.

In a way, Effects act like integrated circuits in that a user must understand what each Effect does before they may be wired together. Like integrated circuits, a collection of Effects wired together can achieve complex results that exceed the sum of the parts.

When Effects are wired together, they form an Effect graph. An Effect graph, as the term is utilized herein, is a Directed Acyclic Graph (DAG). It's "directed" because all connections imply a direction of data flow (from the output of one Effect to the input of the next). It's "acyclic" because no loops are allowed, that is, no path through the graph causes an Effect's output to come back as one of its inputs. It's a "graph" rather than a "tree" because the output of an Effect can feed the inputs of multiple Effects. Effect graphs connect multiple Effects together to achieve a complex output built up from multiple simpler building blocks.

Figure 3:
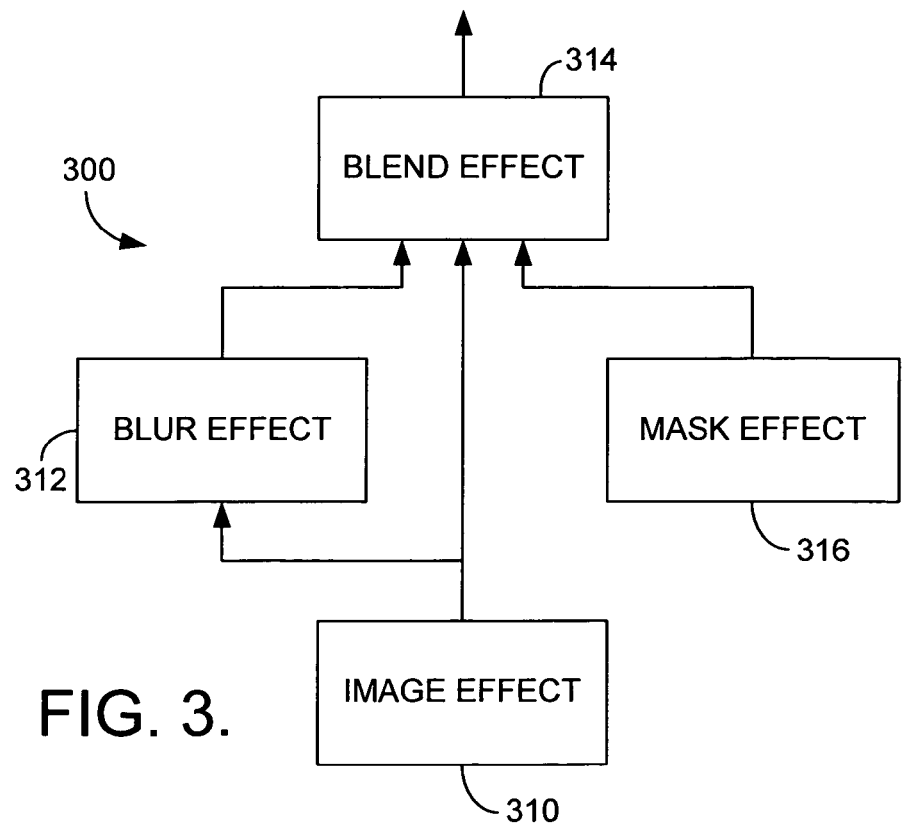
FIG. 3 is an schematic diagram of an exemplary Effect graph that selectively blurs areas of an input image as directed by a mask, in accordance with an embodiment of the present invention.

With reference to FIG. 3, a schematic diagram of an exemplary Effect graph 300 is illustrated that selectively blurs areas of an input image as directed by a mask. Notice how the image Effect object 310 supplies image data to both the blur Effect object 312 and the blend Effect object 314. This would not be possible in a tree structure. Additionally, there are no cycles in the Effect graph 300. That is, the output of, for instance, the blend Effect object 314 is not the input of one of the other Effect objects (image Effect object 310, blur Effect object 314, or mask Effect object 316). The model of the present invention automatically checks for cycles when an Effect graph is rendered and/or changed to prevent infinite loops.

When an Effect is called upon to render, some interesting things happen with each Effect. First, each Effect determines if the request can be satisfied using an existing cached buffer. While caching strategies are discussed more fully below, for now it is sufficient to contemplate that no work needs to be done if the output of that work already exists in an appropriate cache. If the request can be partially satisfied by an existing cache buffer (this happens frequently, for instance, when a user is panning through an image or re-sizing the window), overlapping pixels are copied from the cache to a new image buffer and then the remaining pixels are rendered and copied into the appropriate parts of the new buffer.

Effects may be rendered using two different methods: a required render method which operates the CPU (software render) and an optional render method which operates the GPU (hardware renderEach Effect determines whether it should attempt to render in hardware (GPU) or software (CPU). The choice can be mandated by the user (there is a software-render-only override associated with each Effect), by the application, and/or by the current context (a software-render-only override in the context allows the client or any Effect higher in the graph to force software rendering of the sub-graph). If no software override is mandated, the base class will attempt to render the Effect in hardware and, if possible, an image buffer containing the requested result will be returned. If the Effect cannot be rendered in hardware, a software rendering will take place.

Note that there are also dynamic conditions that might influence which rendering method is called. For example, an Effect might call for a hardware render but catch an out-of-memory exception an attempt is made to allocate temporary buffers that exceed the available memory of the video card. The default response is for the Effect to call for a software render (CPU) to get the results it needs. That is, the model can fall back to the CPU if it runs out of GPU memory. In this way, performance can be optimized based on resource availability.

An Image buffer represents image (pixel) data stored in system memory (CPU memory), video memory (GPU memory), or both and is passed from one Effect to another through the Effect graph. The actual location of the data is generally not important to the user as the user may simply ask for the data desired for processing at the location s/he desires to process it and the Image buffer will automatically copy the data to that location, if necessary. That is, Image buffers hide the details of where the pixel data is stored and automatically make it available in the appropriate location for the Effect.

An image buffer is the main class used by Effects to read and write image data. Image buffers generally have a maximum size that is quite small in comparison to the size of images a user may desire to render. For instance, in one embodiment, the maximum width or height dictated by hardware limitations may not exceed 2K pixels in either dimension. A particular Effect graph might not even be able to render 2K pixels in a single pass. The maximum size depends on the particular Effects contained in the graph. For example, a large-radius blur Effect must read many more pixels than it writes, so the maximum buffer size it can produce is reduced by the amount it over-samples its input.

Users cannot easily anticipate these limitations when making a rendering request. As such, a user simply asks for what they need. However, it is a possibility that the returned buffer will be of a different size than was requested.

An instance of an image buffer holds memory that is allocated and cannot be reclaimed. Image buffers are useful to hold image data that is being actively read or written by an Effect.

Sometimes, an Effect might like to cache image data between rendering passes. However, this data cannot be reclaimed if held in an image buffer. If video memory runs low as the rest of the Effect graph is rendered, the engine must revert to software rendering unless it can reclaim sufficient resources.

The Image cache object is an alternate way to cache image data. The image cache object allows an Effect to keep a reference to image data that it would like to reuse during subsequent rendering, but it could regenerate if it had to. By holding an image cache object and releasing the image buffer object, the Effect allows the memory to be reclaimed when video memory gets tight. The goal is to allow other Effects to use hardware (GPU) acceleration rather than reverting to software (CPU) rendering in low memory scenarios. A user attains an image cache instance from any image buffer s/he may want to read at a later time. Subsequently, the image buffer may be released while the image cache continues to be held. This maintains a reference to the image data and allows reclaiming of the contents thereof if necessary.

The organization of Effects into graphs, as opposed to trees, presents some challenges during rendering. For example, contemplate an Effect graph such as the one illustrated in the schematic diagram of FIG. 4. In the illustrated Effect graph 400, there are four ways for image data to flow from the bottom image Effect object 410 to the output of the top blend Effect object, blend Effect B 418. First, image data may flow from image Effect object 410, to blend Effect object A 414, to blend Effect object B 418. Second, image data may flow from image Effect object 410, to levels Effect object 412, to blend Effect object A 414, to blend effect object B 418. Third, image data may flow from image Effect object 410, to levels Effect object 412, to blend Effect object A 414, to blur Effect object 416, to blend Effect object B 418. Fourth, image data may flow from image Effect object 410, to blend Effect object A 414, to blur Effect object 416, to blend Effect object B 418.

While four passes through the Effect graph may not seem to be unmanageable, the combinatorial possibilities are exponential. If a few more Effects are coupled with additional blend Effects, the number of unique paths through the graph grows to hundreds or thousands. A naive rendering model must render Effects near the bottom of the graph many times, producing the same output each time. This exponential growth and repeated rendering of identical Effects leads to highly inefficient and slow digital image processing.

The model of embodiments of the present invention alleviates some, if not all, of this excessive rendering by including automatic buffer caching at each Effect. For instance, if the blend Effect object A 414 in the Effect graph of FIG. 4 holds a cache, it may simply return the cache each subsequent time it is asked to render, rather than making two more requests to level Effect 412 and image Effect 410 to render its inputs. In this example, the image Effect object 410 is only asked for its output twice rather than four times.

More particularly, in order to get from raw image to final output using an Effect graph, each Effect along the path must be queried for its output. However, an Effect can't render its output until its input buffers are rendered. As such, upon being asked for its output, each Effect queries its inputs (i.e., queries for the image buffers of its input Effects so that it can operate on them). However, an Effect's inputs can't render their output until their respective input buffers are rendered and, accordingly, must query its own inputs. This querying process continues all the way from the top of the Effect graph (where the final output is rendered) to the bottom where the input (e.g., raw image, JPEG, etc.) is rendered. Additionally, this process must be completed for each query by following one potential path through the Effect graph at a time. For instance, in the above-described example utilizing the Effect graph of FIG. 4, while blend Effect object B 418 only has two inputs, each of those inputs must query its inputs along two different paths to render its output. Each Effect produces an image buffer for each potential path and provides the final Effect (in this example, blend Effect object B 418) with one of the needed inputs for outputting the final output.

However, when caching is utilized by the intermediate Effects in the Effect graph (e.g., levels Effect object 412, blend Effect object A 414, and blur Effect object 416), each intermediate Effect may hold or cache the query results computed during the most recent prior time the Effect graph was rendered. In this way, when a query is initiated at the top of an Effect graph, once an intermediate Effect that is common between the two paths being examined is reached, it is not necessary to query all the way back to the bottom of the Effect graph. That is, the query only needs to progress back to the first Effect that is common between the paths being examined. Locating this common Effect between two paths of an Effect graph and caching or holding information at that point, alleviates the potential exponential calculations discussed above.

In order to determine at which Effects a cache should be held during an initial pass through the Effects graph (and to prevent unnecessary caching at Effects that will not be further queried), a pre-rendering pass of the graph is performed before rendering is begun. The pre-rendering pass identifies, before any actual computations are performed on the pixels, what area of the Effect graph is going to be queried and identifies those portions of that area that are going to be asked for multiple times during the rendering, as well as the number of querying instances that may be expected. Then, upon rendering, any Effect identified as requiring multiple queries may cache the queried information in an associated image buffer until it has been called on the maximum number of times. At that point, the image buffer may be released as the information contained therein is not going to be asked for again.

Figure 4:
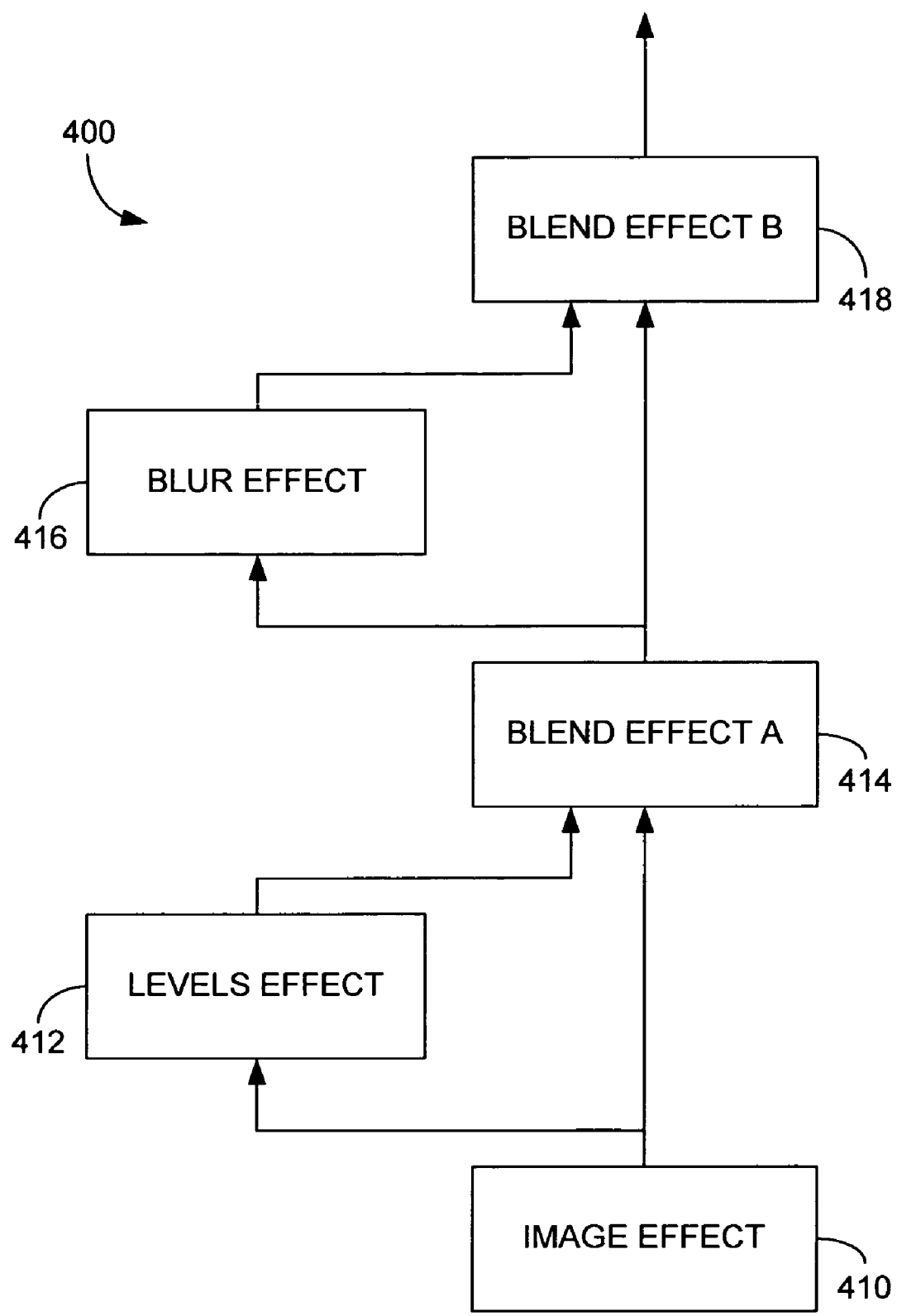
FIG. 4 is a schematic diagram of an exemplary Effect graph, in accordance with an embodiment of the present invention.

In the example illustrated in FIG. 4, blend Effect object 414 is queried for image buffers with two different sizes as the blur Effect object 416 reads more pixels than it writes. In this case, it is fortunate that the larger image buffer is requested first, and the second request may be satisfied without further rendering. However, if the larger image buffer request came after the smaller image buffer request, the request would not be as easily fulfilled.

To avoid inadequate performance when rendering requests come in increasing order of size, the model of the present invention provides for the performance of a pre-rendering pass. The pre-rendering pass was discussed hereinabove with respect to identifying portions of the Effect graph which will be subject to multiple queries for the same information. During the pre-rendering pass, each Effect also accumulates a bounding rectangle that contains similar rendering requests. Thus, during subsequent rendering, an Effect may produce an output buffer that is larger than necessary for the current request, anticipating use of the same cache to satisfy further requests at no additional cost.

These image caches avoid one problem, but cause another in that a lot of video memory is begin reserved to hold cache buffers, some of which may never be used again. The simple solution would be to reclaim cache buffers on a least-recently-used basis whenever an attempt to allocate a cache buffers is made causing an out-of-memory exception to be returned. But that means that video memory is frequently being run at full capacity (which is undesirable for any other user of the video memory), and it incurs the overhead of exception processing on nearly every allocation.

Figure 5:
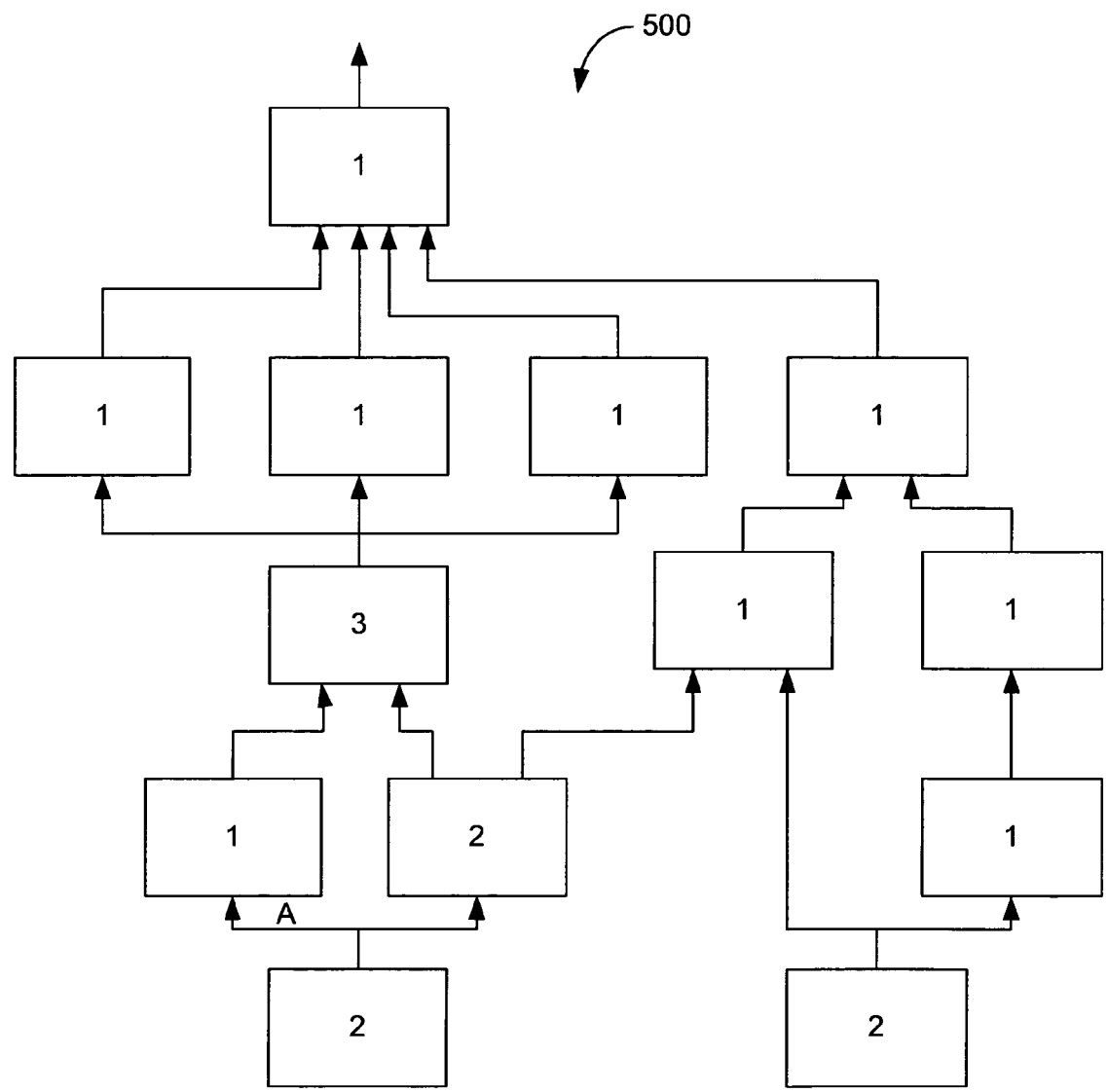
FIG. 5 is a schematic diagram of an exemplary Effect graph with a count shown for each Effect, in accordance with an embodiment of the present invention.

With reference to FIG. 5, a schematic diagram of an Effect graph with a count shown for each Effect is illustrated and designated generally as reference numeral 500. Each Effect has a counter associated with each of its outputs that counts how many connectors are connected to that output. Each time an Effect is finished using one of its input buffers, it calls on the corresponding input Effect to release the output buffer and the counter for that output is decremented. When it reaches zero, the Effect assumes that no further request for that output buffer will be received during the current rendering pass, so the Effect releases its output cache image buffers are held only during a single rendering pass as it is undesirable to hold any more information than necessary due to limited video card (GPU) memory.

Even when an Effect has a cache, it must still tell its input Effects to release their output buffer caches, even though it doesn't need them to render. This is necessary to ensure that Effect counters are properly adjusted (and consequently, caches are properly released).

After rendering is complete, the top Effect will hold the only cache in the graph. Actually, as will be discussed more fully below, there are other reasons a user might want to keep additional caches to accelerate interactive rendering. The present example is provided herein simply to illustrate how caching may be used to prevent exponential rendering.

To accelerate interactive rendering, it is useful to keep caches for parts of the Effect graph that haven't changed from one rendering pass to the next. The way a user typically builds up a project is one Layer or Effect at a time (Layers are discussed more fully below). The user will, for instance, add a Effect to adjust the exposure of an image and then add another Effect to adjust the temperature of the image and then add a third Effect to sharpen the image. Due to this step by step adding of Effects, the user generally adjusts only the most recently added Effect at a time, e.g., the user will complete all exposure adjustments before adding the temperature Effect. However, more that one exposure adjustment may be necessary, each adjustment requiring a rendering pass.

To accommodate this typical project scenario and avoid unnecessary re-rendering of those portions of the Effect graph that haven't changed since the previous rendering pass, the Effect base class includes a "dirty flag" that is set when an Effect has changed since the last rendering pass. During a pre-rendering graph traversal (pre-rendering pass), dirtiness is propagated upwards through the Effect graph, disposing caches on any path between a dirty Effect and the root of the graph.

Dirtiness is used to keep caches for parts of the graph that aren't changing. It is assumed that any dirty Effect is likely to be dirty for the next rendering pass as well. This is the case when the user is adjusting a parameter value or otherwise modifying one Effect at a time.

Figure 6:
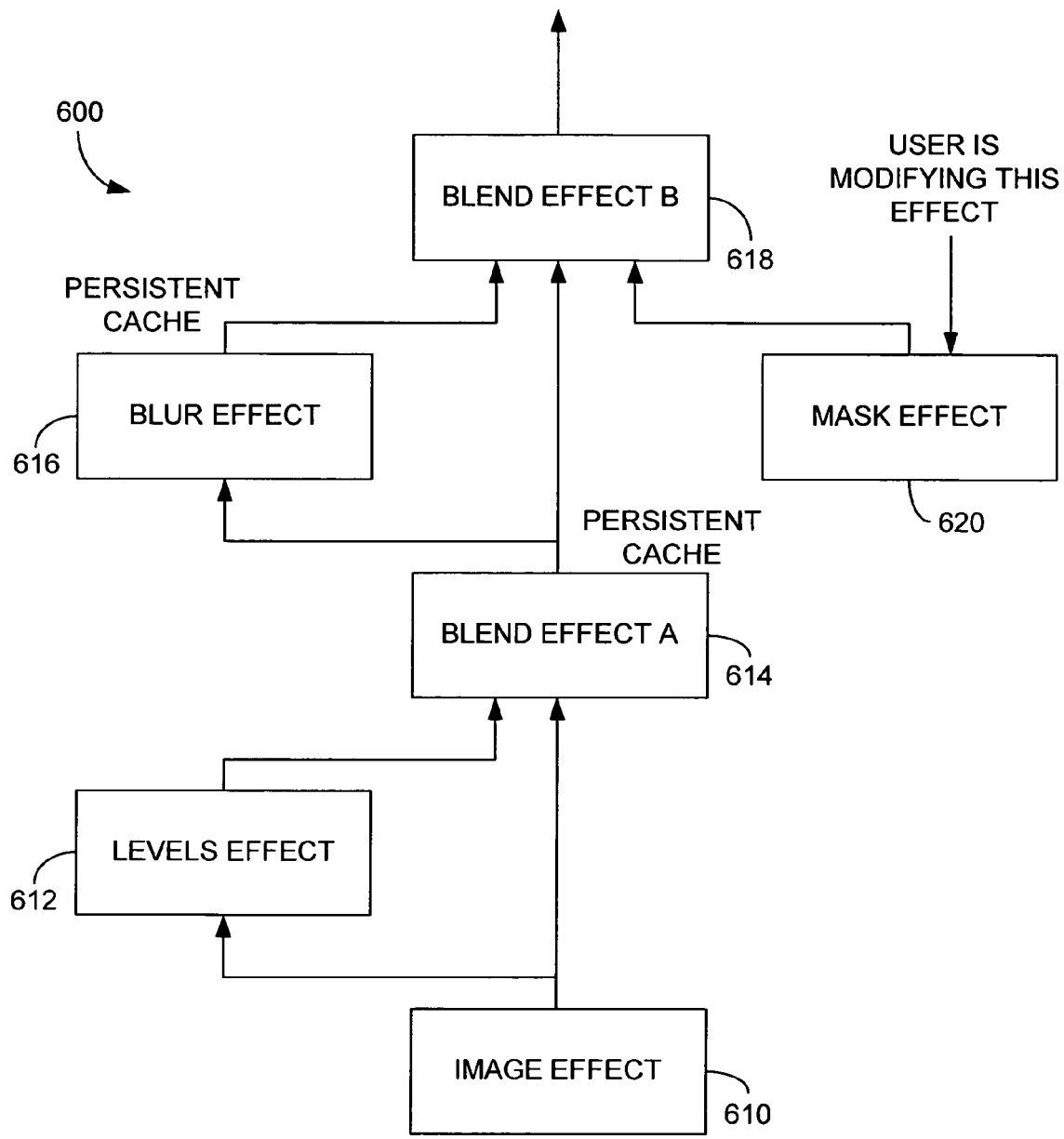
FIG. 6 is a schematic diagram of an exemplary Effect graph illustrating a mask associated with a blur Effect, in accordance with an embodiment of the present invention.

For example, suppose that a user is painting on the mask associated with a blur Effect in the Effect graph illustrated in the schematic diagram of FIG. 6. During the pre-rendering pass, the top blend Effect, blend Effect B 618, detects that it has two input Effects that are not dirty (blend Effect A 614 and blur Effect 616) and a third input Effect which is dirty (mask Effect 620). Whenever an Effect detects this dirtiness discrepancy between its inputs, it assumes that the mask Effect 620 is the only input that is going to be modified on the next rendering pass and instructs the non-dirty input Effects to hold onto their caches. In the illustrated scenario, blend Effect B 618 would instruct blur Effect 616 and blend Effect A 614 to hold onto their caches and would instruct mask Effect 620 to release its cache. (Note that image Effect 610 and levels Effect 612 will not be queried on the next rendering pass as they provide the inputs for blend Effect A 614.) This selective caching may be referred to as "cross-render caching" and the performance improvement in terms of accelerated interactive rendering is significant as only the blend Effect B 618 and mask Effect 620 need to do real work for each rendering pass.

As previously mentioned, the benefits of cross-render caching are especially interesting given that most users build their projects one Layer or Effect at a time, and they usually adjust the last Layer or Effect they added, which is usually at the top of the Effect graph. In the dynamic rendering model of embodiments of the present invention, the user is free to change any Layer or Effect at any time. With cross-render caching, adjustments near the top of the Effect graph will be faster than those near the bottom.

Note that with cross-render caching, caches are held across rendering operations for particular digital image data (i.e., a single image) rather than only during a single rendering pass as was the case with respect to caching for the purpose of avoiding exponential growth of processing operations.

The concept of "Layers" in Effect graphs has been alluded to a number of times herein. In the Effect graph model of embodiments of the present invention, Effects are the "atomic" image processing elements. Layers combine Effects in useful ways that address interesting scenarios. Layers construct Effect graphs, but are not directly involved in processing or rendering them.

To understand why Layers are helpful, consider an adjustment layer model. Contemplate that various different types of adjustments are supported, but all of them support a mask and a blending mode. This is accomplished by separating the masking and blending functionality into individual Effects, and then wiring several simple Effects together to achieve the complex result desired to be achieved. However, when there are repeated editing units, users have to wire the same Effects together over and over, and it's difficult to develop localized intelligence to optimize the graph. For example, the mask Effect can be omitted if the mask is empty, and the blend Effect can be omitted if there is no blending mode and no mask One might think of Layers as smart macros that simplify the creation of standard image editing pipelines. In fact, the concept of a pipeline is introduced by Layers. A Layer takes a single image input and produces a single output. Of course, the Effects within a Layer can be organized in arbitrarily complex sub-graphs.

A Layer takes any Effect and adds support for arbitrary blending modes controlled by an optional mask. In one example, this looks like the schematic illustration shown in FIG. 7, the Layer being designated generally as reference numeral 700. Each Layer owns its Effects and wires them together dynamically (i.e., at run time) to create its part of the Effect graph. It can apply smart dynamic optimizations to the graph. For example, since a Layer receives events when its Effects change, if it notices that the blend Effect 710 mixing parameter has changed to its minimum value, it might exclude the blend Effect and the mask Effect 712 from the Effect graph it builds.

Figure 7:
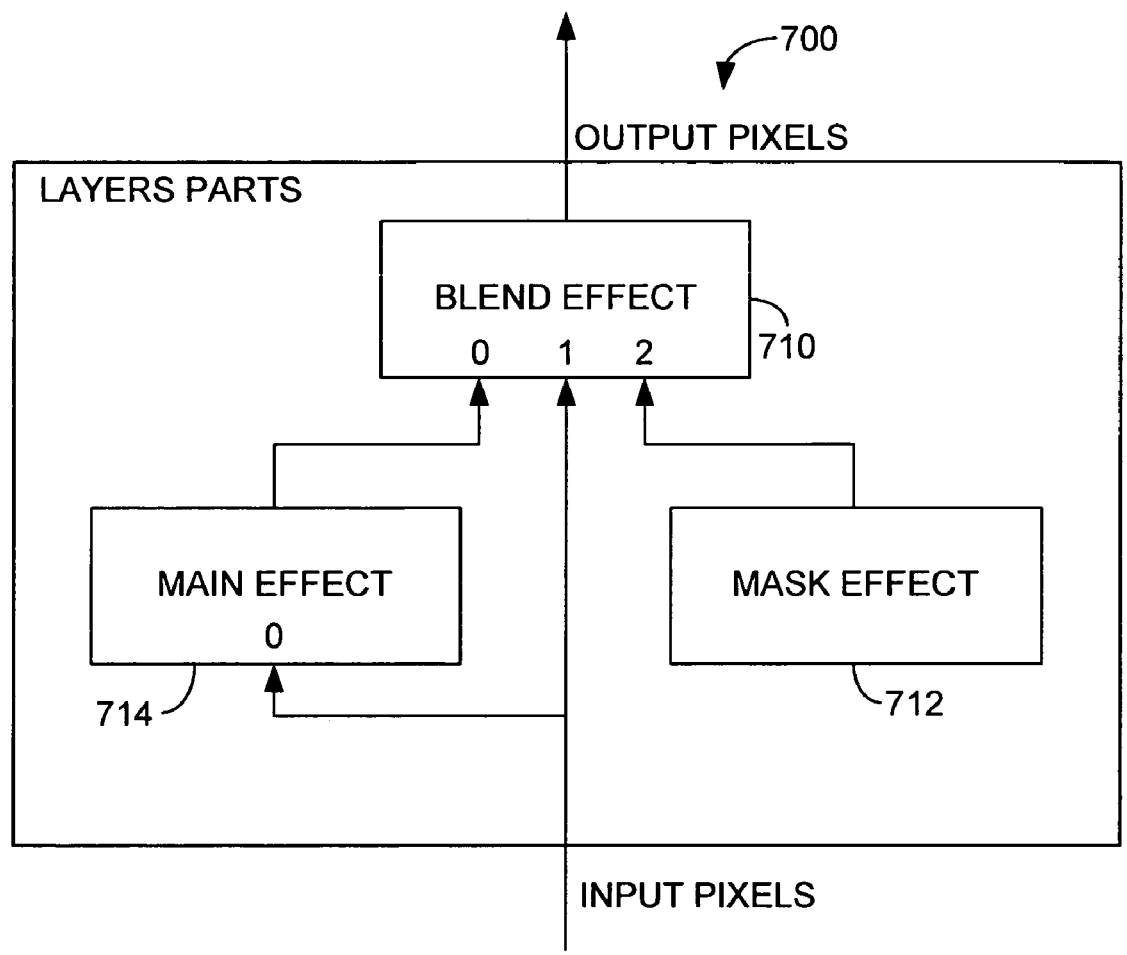
FIG. 7 is a schematic diagram of an exemplary Layer for use in an Effect graph, in accordance with an embodiment of the present invention.

The Effect graph of FIG. 7 shows the most common way the blend Effect 710, mask Effect 712, and main Effect 714 may be wired together. However, the Layer supports more complex relationships among these three Effects. In some cases, the mask Effect may be automatically generating mask data based on the Layer's input image. The main Effect may or may not depend on input image data. In some cases, the main Effect may need access to mask data.

Figure 8:
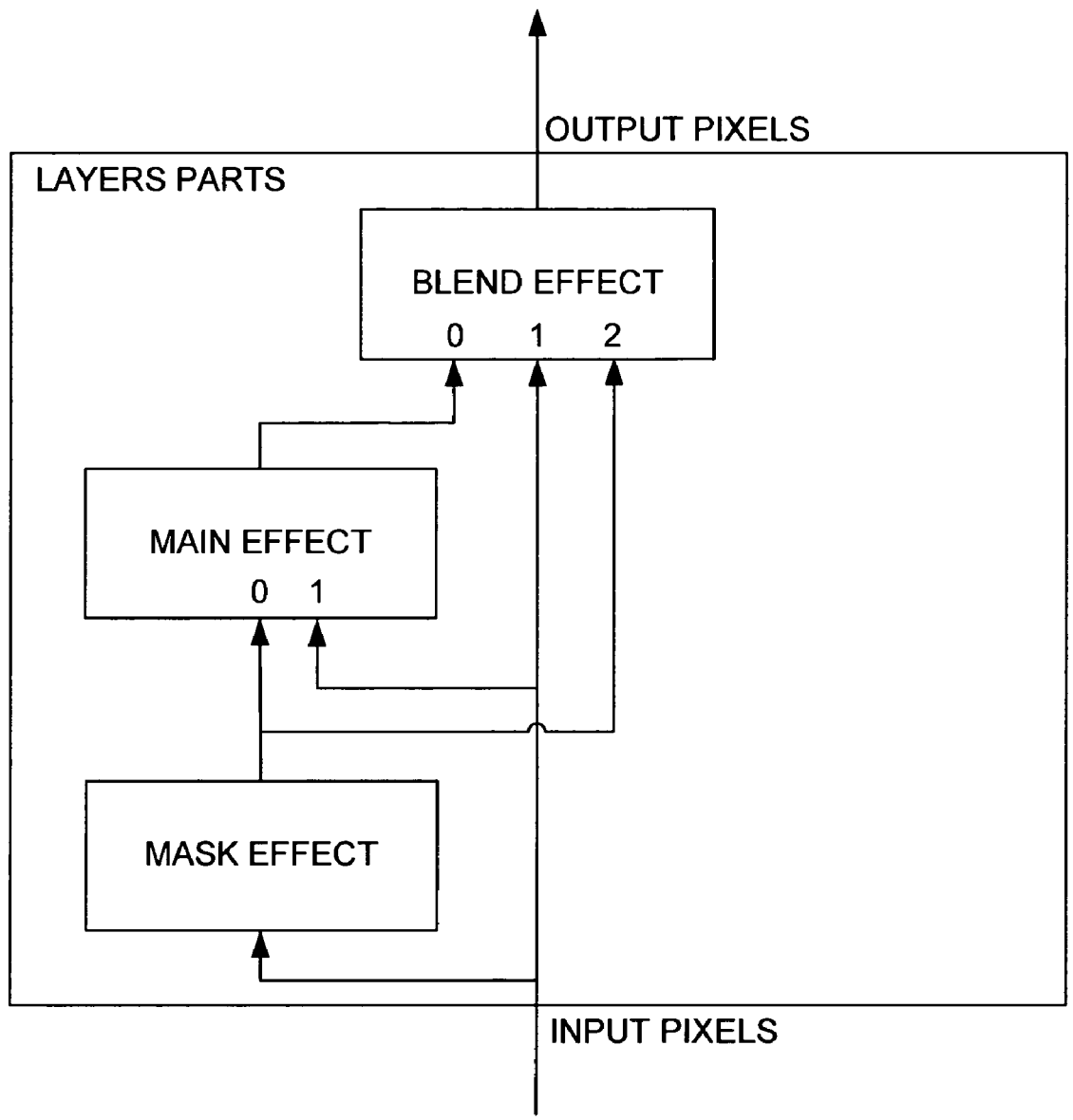
FIG. 8 is a schematic diagram of an exemplary fully-connected Layer of an Effect graph, in accordance with an embodiment of the present invention.

A fully-connected Layer may look like the schematic diagram of FIG. 8. Of course, Layers can get even more complicated than what is shown in FIG. 8. Layers can replace any of the Effects shown in the diagram with multiple Effects wired arbitrarily.

An Effect that outputs a single-channel image buffer can serve as a mask Effect. Masks may be constant pixel-based masks (i.e., single-channel image Effect) or constant vector-based masks (i.e., that rasterizes vector-based data into a single-channel output buffer. Additionally, in some situations, a mask may be generated dynamically from input data. Generally, this would be accomplished by a user's dynamic selection of pixels that satisfy some criteria, e.g., a particular color range.

For instance, with reference to the mask Effect of FIG. 8, suppose a user desires to lighten the shadows in a particular image coming up the pipeline. Accordingly, s/he adds an exposure Layer into the Effect graph and places a mask on that Layer such that the mask will be placed only in the shadowed regions of the image. Generally, masks are painted on or pasted in based on pixel selections and, accordingly, they are static. However, in accordance with embodiments of the present invention, the pixel data and the masks can be made dynamic by including an instruction that allows the user to, e.g., select the sky for darkening. This would be accomplished by the user's dynamic selection of pixels that satisfy the criteria of the particular color range of the sky. Subsequently, whenever the pipeline is changed (e.g., by the addition of a rotation Layer), the mask is automatically re-calculated rather than having to be re-painted on by the user.

In cases where automatic corrections such as dynamic masking can be done in the GPU, this is a very compelling scenario because the mask will be generated at the same resolution as the input image. Unlike constant masks, no rasterization of vectors or interpolation of image samples is required.

One of the main advantages of dynamic masking is that dynamic masks permit a user to make changes to the pipeline and have the masks adapt to those changes where appropriate. An example would be red-eye. Red-eye may be corrected by de-saturating the region of the pupil using a mask to locate the pupil on a de-saturation Effect Layer. Setting the mask statically (algorithmically using a selection on red pixels or by hand) would fail if the underlying image was moved (translated, rotated or scaled, for instance). A dynamic mask, however, can re-detect where the red pupils were in the image and re-set the mask.

The Layer class expects blend Effects to have three inputs (two images to blend plus a mask). Each blend algorithm is represented by a separate Effect subclass. There will generally be enough common code to warrant a common base class. When the user changes a Layer's blend mode, the previous blend Effect is discarded, and the new blend Effect takes its place as the Effect graph is rebuilt.

No blend Effect is required (the Layer's output is simply the output of the main Effect) if no mask Effect is connected to the blend Effect; a fully-opaque mask is assumed.

A "single-input, single output" Layer model significantly simplifies the process of building Effect graphs. An additional benefit of Layers becomes apparent when a user wishes to save a configuration of a pipeline they've created. With an Effect graph, saving is actually a rather difficult task to accomplish. Each Effect would have to be asked to serialize itself (i.e., save its settings and the like) and, using that information, the Effect graph would have to be scribed into, e.g., XML. The Layer model makes this simpler as the rendering engine itself is aware that the graph contains a number of Layers and can describe each of them. The Layers are then asked to describe themselves. As each Layer has its respective graph built internally, that information does not need to be stored.

An additional advantage of Layer serialization over Effect serialization is that Layers are in trees and Effects are in graphs which can be (and generally are) DAGs. A greedy depth-first recursive serialization of a tree may be performed (e.g., at each node, an Effect can query its children to describe themselves and then describe itself). In a DAG, this runs exponentially, for all the same reasons discussed hereinabove with respect to caching to prevent rendering from going exponential in Effect DAGs. As such, it is much cleaner to address this issue at the Layer level than at the Effect level.

In the dynamic digital processing image model in accordance with embodiments of the present invention, where and when data is transformed is fairly important, both in terms of quality and performance. To understand the quality concerns, suppose a user wishes to rotate an image using a conventional image processing model. Once it is determined that the image is in the desired orientation, the rendering engine must re-sample the image at the new rotated value and produce a new set of pixels from that data. If the user then rotates the image again, the conventional rendering engine does not remember where the image started before the prior rotation. As such, it simply rotates the image again (unaware that it has been rotated before) and, upon completion, re-samples the image and produces a new image again. This process can go on an on as additional rotation corrections are performed, with the data being re-sampled and a new image created each time. The challenge with this approach is that every time it is re-sampled, the data degrades.

In the dynamic digital processing image model in accordance with embodiments of the present invention, however, all adjustments are dynamic. Thus, when a user rotates an image, the rendering engine remembers the cumulative amount it has been rotated. That is, each time it is asked to make a rotation modification, it goes back to the original data and applies the rotation. Therefore, when an image is regenerated subsequent to a rotation modification, it is re-sampled only once from the original image data. This significantly reduces the amount of degradation the image must endure.

Further, this behavior may be preserved, even when there are different transformations at different levels of the project that are each adding some rotation. The accumulated product of all transforms throughout the Effect graph are summed and applied just once. This application is usually performed near the bottom Layer of the pipeline as there is a mechanism in the rendering Engine that accumulates all transformations and pushes them as far down the pipeline as possible before they are applied. In this manner, transformations are not performed any more often than necessary and on the smallest number of pixels needed to produce an accurate render.

It should be noted that there are a couple of things that can stop a transformation from being pushed through the Effect graph. For instance, an Effect that doesn't understand how to operate on pixels that have been transformed may be encountered and, thus, that particular Effect has to operate on the un-transformed image, the transformation being applied only after the Effect has been applied.

To accommodate for situations such as this, during the pre-rendering pass, each Effect informs the engine what kinds of transformations it can handle and what kinds of transformations it cannot handle, as more fully described below.

As previously stated, when transformations take place is also important from a performance perspective. In the Effect graph pipeline, it is most efficient to process as little data as possible. Suppose a user has loaded a very large image (e.g., one billion pixels) and they desire to begin editing that image. Instead of operating at the resolution of the image (e.g., instead of operating on one billion pixels), the dynamic rendering model of embodiments of the present invention operates at the resolution the user is actually viewing, e.g., the two million pixels or so at which the display device being utilized outputs the image. It is desirable to knock down the resolution of the image at the earliest possible moment in the pipeline so that every Effect that is dealing with the image thereafter is dealing with a resolution of the data that is considerably smaller. As such, the Effects can operate on the image much faster and use significantly less GPU or CPU image memory. It should be noted that a scaling factor is being applied to the data to permit this result. However, just as previously discussed with regard to quality concerns, there may be Effects which cannot handle a scaling, that is, Effects that do not know how to deal with scaled data. Accordingly, during the pre-rendering pass, each Effect will inform the engine if it cannot handle this type of transformation and the scaling will not take place until that Effect has already processed the non-scaled data.

It should be further noted that the effect of pushing transformations as far down the pipeline as possible may result in a particular transformation not taking place at the location that a user has specified if the rendering engine determines that it can actually be applied at another transformation location down lower in the Effect graph.

By way of example only, imagine that a user has produced an Effect graph with a blur Effect (blur with a pixel radius of five) and then a down-sample or scaling Effect (by a factor of ten). The user would expect the blur radius to be applied and then the image scaled. In reality, however, as the down-sample Effect is a transformation, if it can be pushed down the graph, it will be applied to the sample first and then the blur will be applied to the lower resolution image. Note that the blur Effect will have to be modified in this instance to, e.g., ½ pixel blur for the overall effect to be the same from the user's (viewing) perspective. If the blur Effect declared to the rendering engine that it could not handle blurring a scaled image, the scaling Effect would not be pushed below it in the pipeline.

Figure 9:
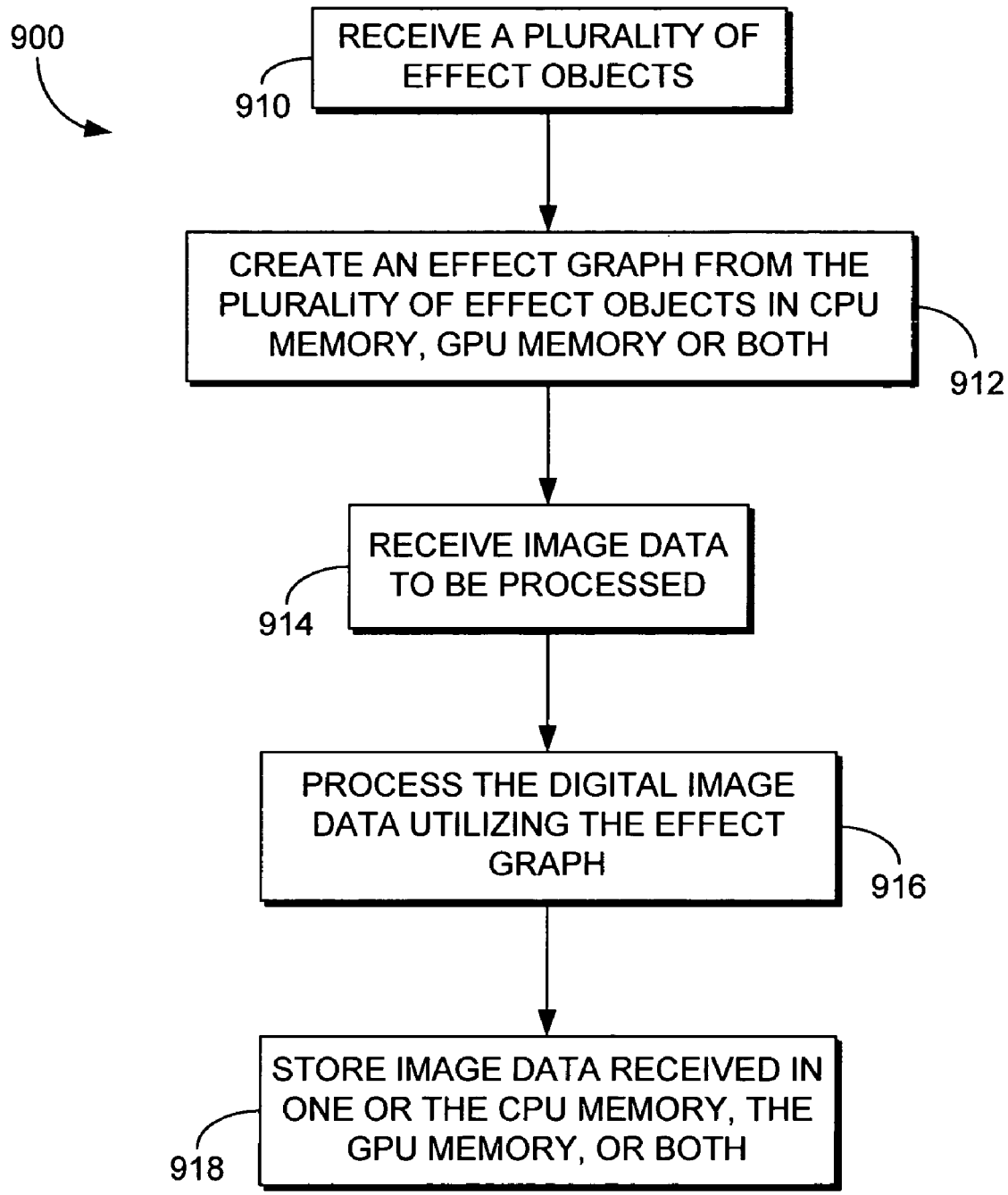
FIG. 9 is a flow diagram illustrating a method for processing digital image data utilizing an Effect graph, in accordance with an embodiment of the present invention.

Turning now to FIG. 9, a flow diagram is illustrated which shows a method 900 for processing digital image data utilizing an Effect graph in accordance with an embodiment of the present invention. Initially, as indicated at block 910, a plurality of Effect objects are received. Effect objects have been discussed extensively hereinabove and may include, by way of example only, a blend Effect object, a mask Effect object, a blur Effect object, and the like. Once the plurality of Effect objects have been received, an Effect graph is wired into an Effect graph utilizing at least a portion of the plurality of Effect objects, as indicated at block 912. The Effect graph may be rendered utilizing any of CPU memory, GPU memory and a combination of CPU memory and GPU memory as necessary and/or desired.

Subsequently, as indicated at block 914, digital image data to be processed is received. The digital image data is then processed utilizing the Effect graph, as indicated at block 916. In one embodiment, processing the digital image data may include non-destructively processing at least a portion of the digital image data received. Next, the processed digital image data may be stored in at least one of the CPU memory and the GPU memory in association with at least one image buffer. This is indicated at block 918.

It should be noted that image buffers in accordance with embodiments of the present invention are capable of being passed between the GPU and the CPU automatically and without user intervention. Additionally, image buffers in accordance with embodiments of the present invention are capable of being converted between a first pixel data format and a second pixel data format automatically and without user intervention.

Figure 10:
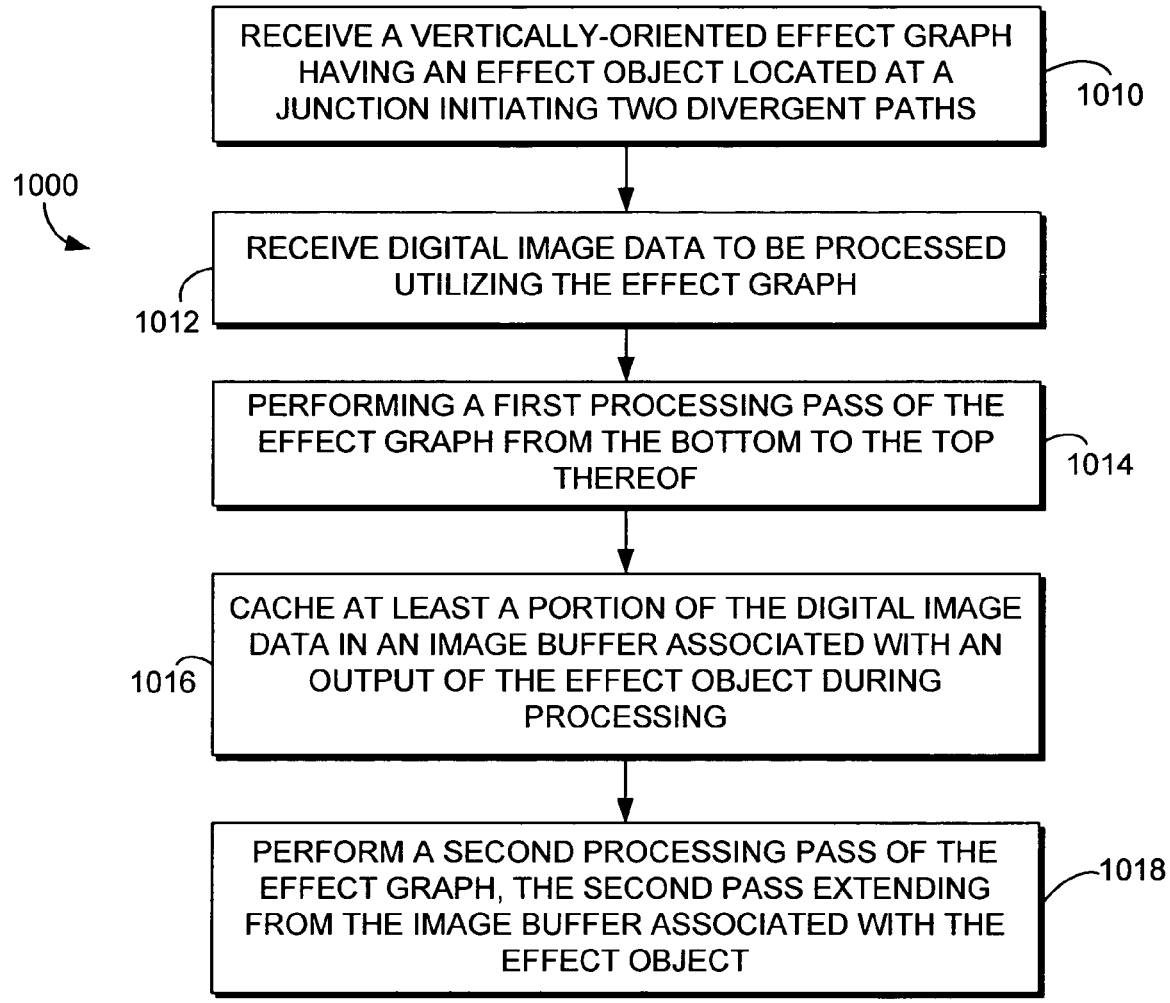
FIG. 10 is a flow diagram illustrating a method for processing digital image data utilizing a vertically-oriented Effect graph in accordance with an embodiment of the present invention.

With reference to FIG. 10, a flow diagram is illustrated which shows a method 1000 for processing digital image data utilizing a vertically-oriented Effect graph, the digital image data being processed from a bottom of the Effect graph to a top of the Effect graph, in accordance with an embodiment of the present invention. Initially, as indicated at block 1010, a vertically-oriented Effect graph having a an Effect object located at a junction initiating two divergent paths is received. Subsequently or simultaneously, digital image data to be processed utilizing the Effect graph is received, as indicated at block 1012. Next, as indicated at block 1014, a first processing pass of the Effect graph from the bottom to the top thereof is performed along a first of the two divergent paths.

During processing, at least a potion of the digital image data is cached in an image buffer associated with an output of the Effect object. This is indicated at block 1016. Subsequently, a second processing pass of the Effect graph is performed, the second pass extending from the image buffer associated with the Effect object, as indicated at block 1018.

Figure 11:
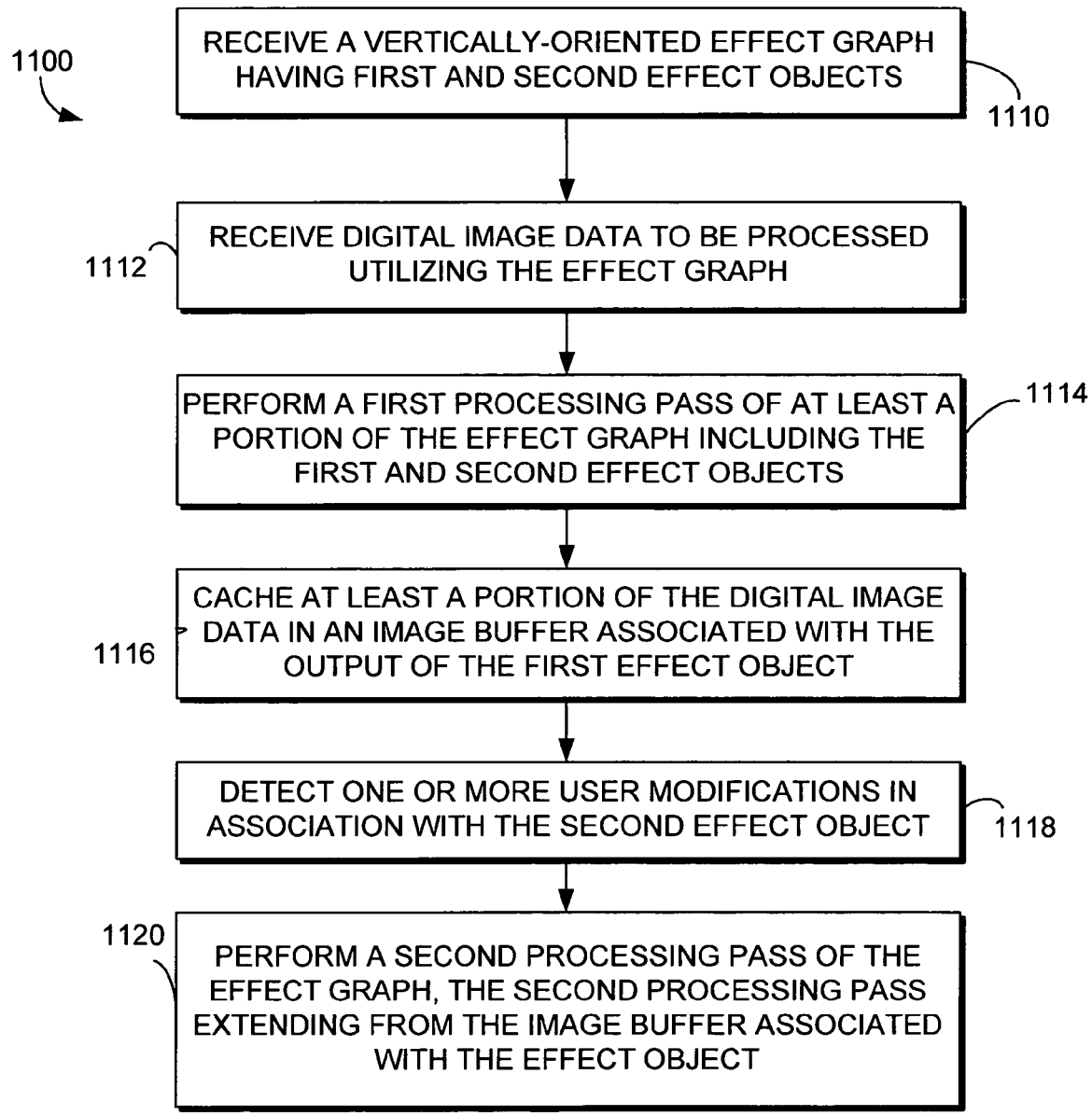
FIG. 11 is a flow diagram illustrating a method for processing digital image data utilizing a vertically-oriented Effect graph in accordance with an embodiment of the present invention.

With reference to FIG. 11, a flow diagram is illustrated which shows a method 1100 for processing digital image data utilizing a vertically-oriented Effect graph, the digital image data being processed from a bottom of the Effect graph to a top of the Effect graph, in accordance with an embodiment of the present invention. Initially, as indicated at block 1110, a vertically-oriented Effect graph is received. The Effect graph includes at first and second Effect objects. Subsequently or simultaneously, digital image data to be processed utilizing the Effect graph is received, as indicated at block 1112. Subsequently, a first processing pass of at least a portion of the Effect graph including the first and second Effect objects is performed, as indicated at block 1114. Next, as indicated at block 1116, at least a portion of the digital image data is cached in an image buffer associated with the output of the first Effect object, as indicated at block 1116.

Subsequently, one or more user modifications in association with the second Effect object are detected, as indicated at block 1118. Next, as indicated at bock 1120, a second processing pass of the Effect graph is performed, the second processing pass extending from the image buffer associated with the output of the Effect object.

Figure 12:
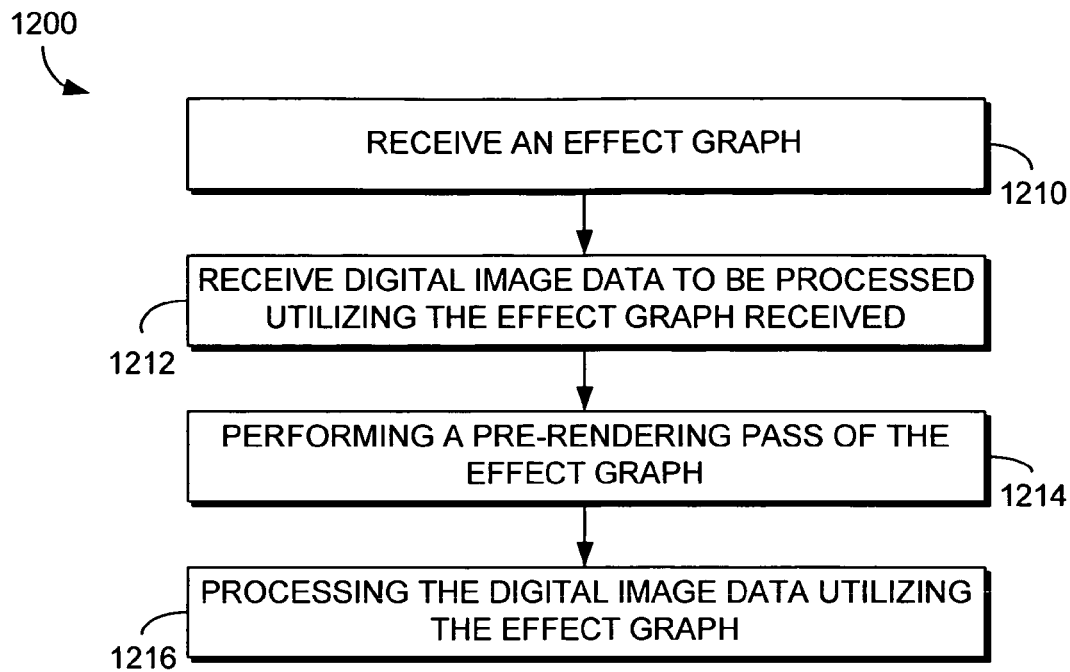
FIG. 12 is a flow diagram illustrating a method for processing digital image data utilizing an Effect graph in accordance with an embodiment of the present invention.

Turning now to FIG. 12, a flow diagram is illustrated which shows a method 1200 for processing digital image data utilizing an Effect graph, in accordance with an embodiment of the present invention. Initially, as indicated at block 1210, an Effect graph is received. The Effect graph includes a plurality of Effect objects each having an image buffer associated therewith for storing digital image data. Subsequently or simultaneously, as indicated at block 1212, digital image data to be processed utilizing the Effect graph is received. Next, a pre-rendering pass of the Effect graph is performed, as indicated at block 1214. Subsequently, the digital image data is processed utilizing the Effect graph, as indicated at block 1216.

Figure 13:
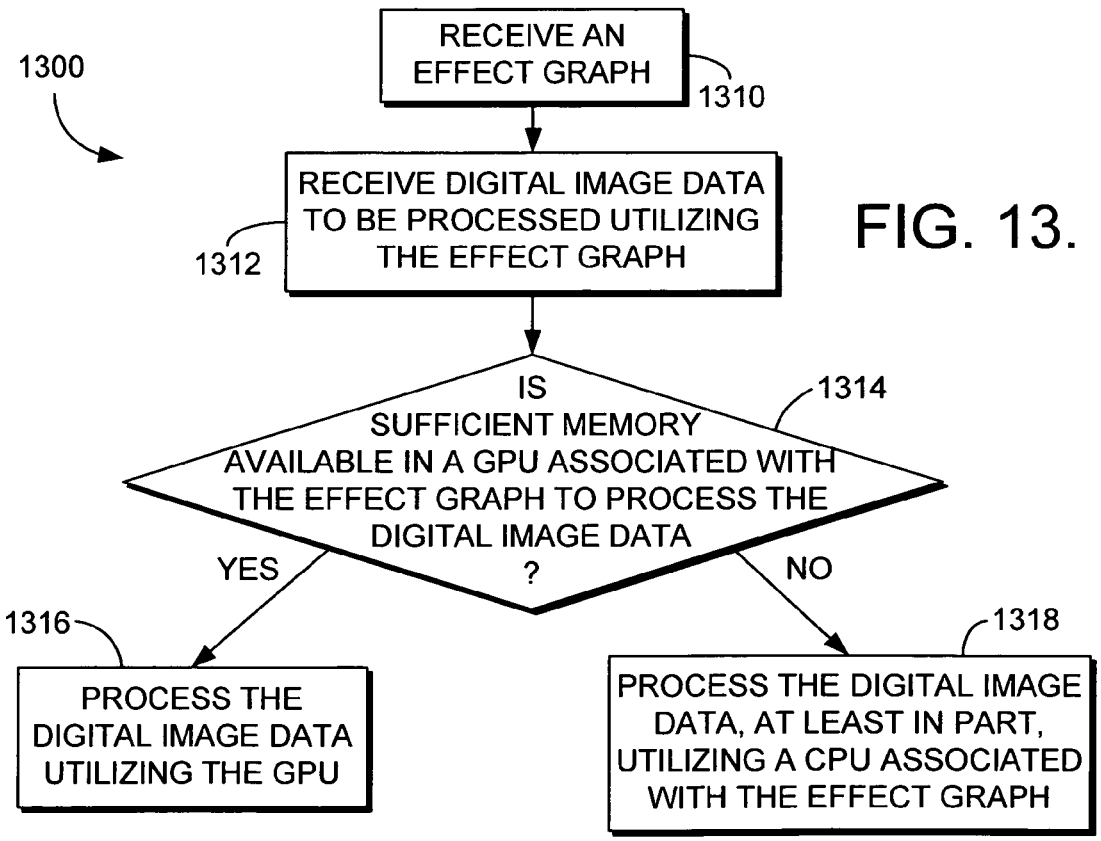
FIG. 13 is a flow diagram illustrating a method for processing digital image data utilizing an Effect graph in accordance with an embodiment of the present invention.

With reference to FIG. 13, a flow diagram is illustrated which shows a method 1300 for processing digital image data utilizing an Effect graph, in accordance with an embodiment of the present invention. Initially, as indicated at block 1310, an Effect graph is received. The Effect graph includes a plurality of Effect objects each having an image buffer associated therewith for storing digital image data. Subsequently or simultaneously, digital image data to be processed utilizing the Effect graph is received, as indicated at block 1312. Next, it is determined if sufficient memory is available in the GPU associated with the Effect graph to process the digital image data. This is indicated at block 1314. If there is sufficient memory available in a GPU associated with the Effect graph to process the digital image data, the digital image data is processed utilizing the GPU, as indicated at block 1316. However, if it is determined that there is not sufficient memory available in the GPU to process the digital image data, the digital image data is processed, at least in part, utilizing a CPU associated with the Effect graph. This is indicated at block 1318.

Figure 14:
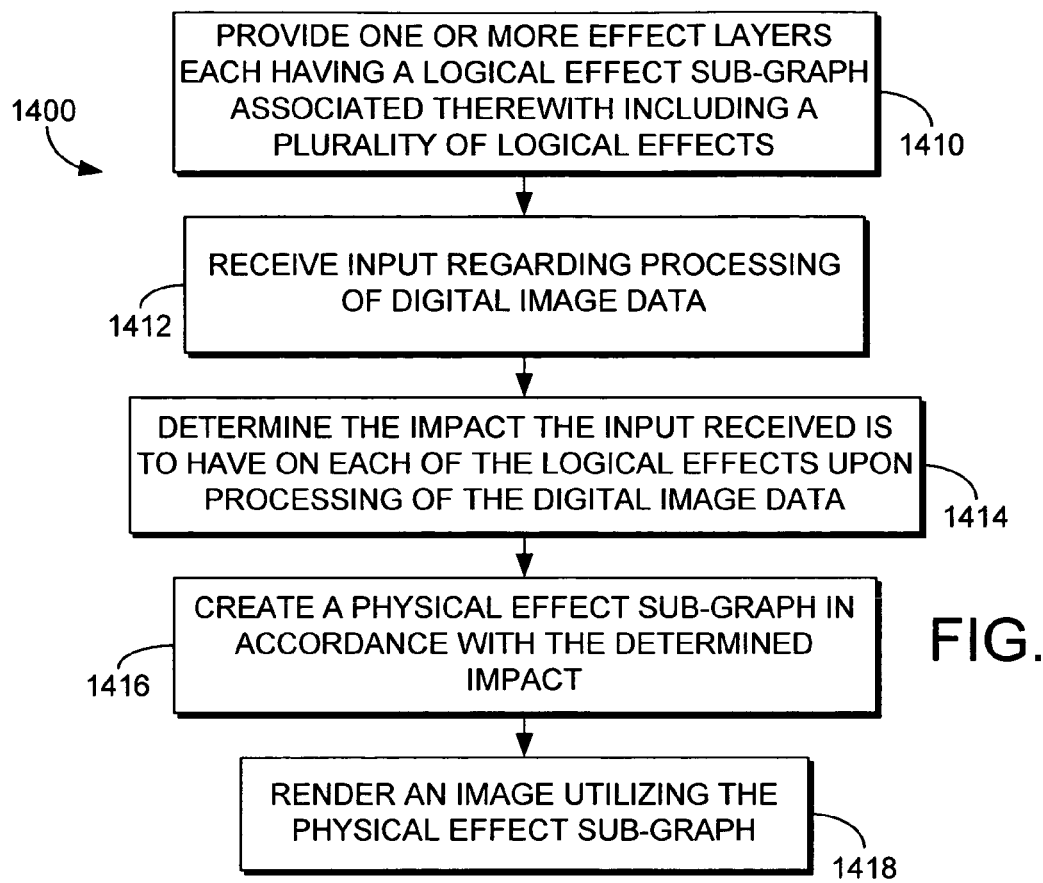
FIG. 14 is a flow diagram illustrating method for creating an Effect graph for processing of digital image data in accordance with an embodiment of the present invention.

Turning now to FIG. 14, a flow diagram is illustrated which shows a method 1400 for creating an Effect graph for processing of digital image data, in accordance with an embodiment of the present invention. Initially, as indicated at block 1410, one or more Effect Layers are provided, each Effect Layer having a logical Effect sub-graph associated therewith that includes a plurality of logical Effects. Subsequently, input regarding the processing of digital image data is received, as indicated at block 1412. Such input may include, by way of example only, the type of main Effect included in the Layer, the settings applied to the Layer interface (e.g., opacity equal to 100%), and other settings and properties. Subsequently, as indicated at block 1414, the impact the input received is to have on each of the logical Effects upon processing of the digital image data is determined. Next, a physical Effect sub-graph is created in accordance with the determined impact, as indicated at block 1416. An image may then be rendered utilizing the physical Effect sub-graph, as indicated at block 1418.

Figure 15:
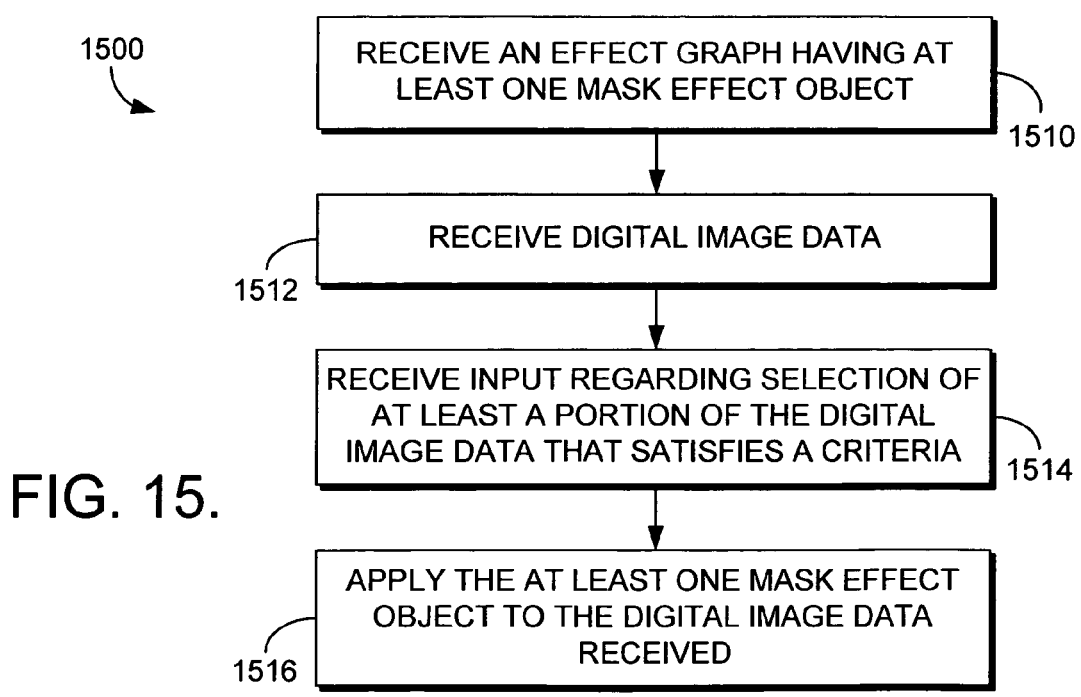
FIG. 15 is a flow diagram illustrating a method for processing digital image data utilizing an Effect graph in accordance with an embodiment of the present invention.

With reference to FIG. 15, a flow diagram is illustrated which shows a method for processing digital image data utilizing an Effect graph, in accordance with an embodiment of the present invention. Initially, as indicated at block 1510, an Effect graph having at least one mask Effect object is received, the mask Effect object being associated with an Effect Layer. Subsequently or simultaneously, digital image data is received, as indicated at block 1512. Next, as indicated at block 1514, input regarding selection of at least a portion of the digital image data received that satisfies a criteria is received. Subsequently, as indicated at block 1516, the at least one mask Effect object is applied to the digital image data received.

Figure 16:
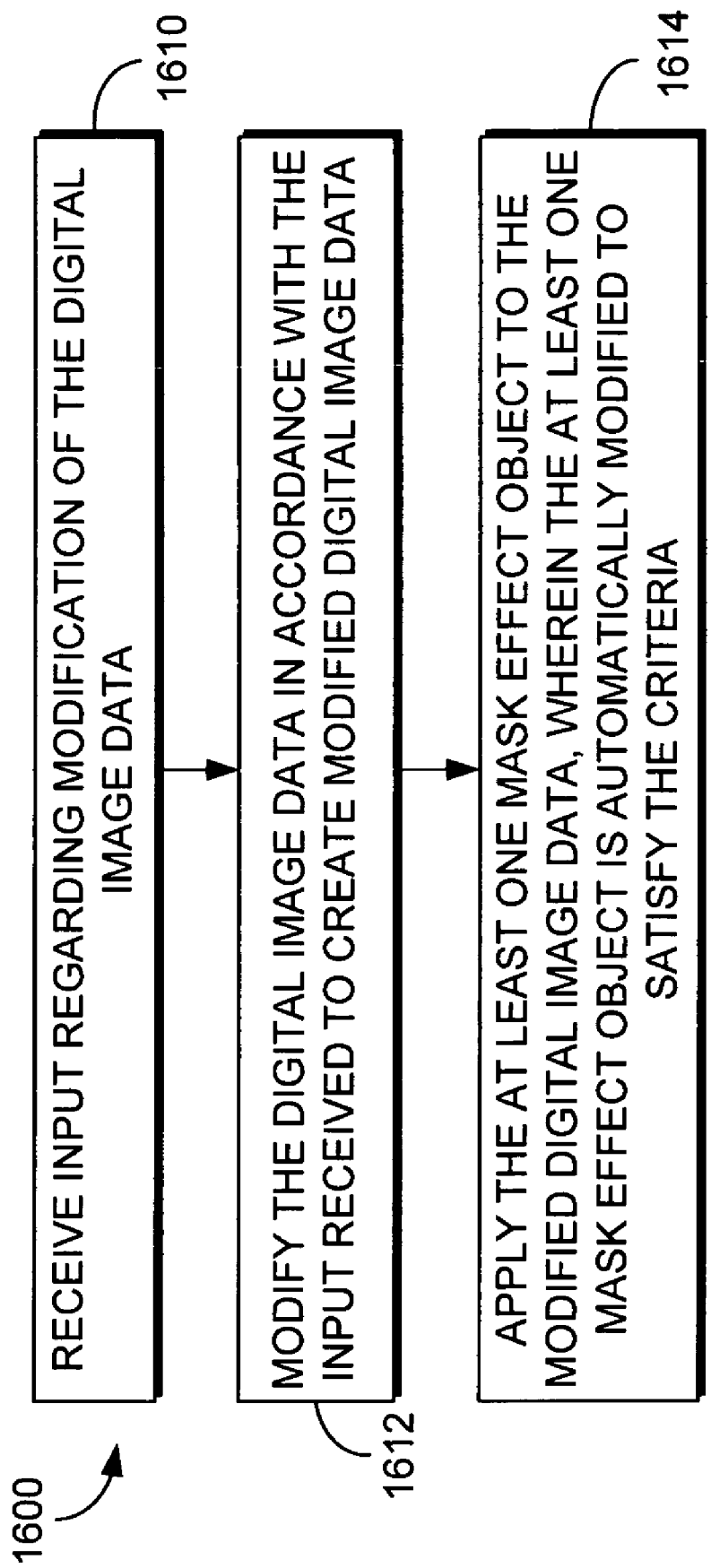
FIG. 16 is a flow diagram illustrating a method for processing digital image data utilizing an Effect graph, the method of FIG. 16 representing additional processing steps that may take place after the method of FIG. 15, in accordance with an embodiment of the present invention

In one embodiment, the method of claim 15 may include further processing steps as shown in FIG. 16. Initially, as indicated at block 1610, input is received regarding modification of the digital image data. Subsequently, the digital image data is modified in accordance with the input received to create modified digital image data, as indicated at block 1612. Next, as indicated at block 1614, the at least one mask Effect object is applied to the modified digital image data and the at least one mask Effect object is automatically modified to satisfy the criteria.

Figure 17:
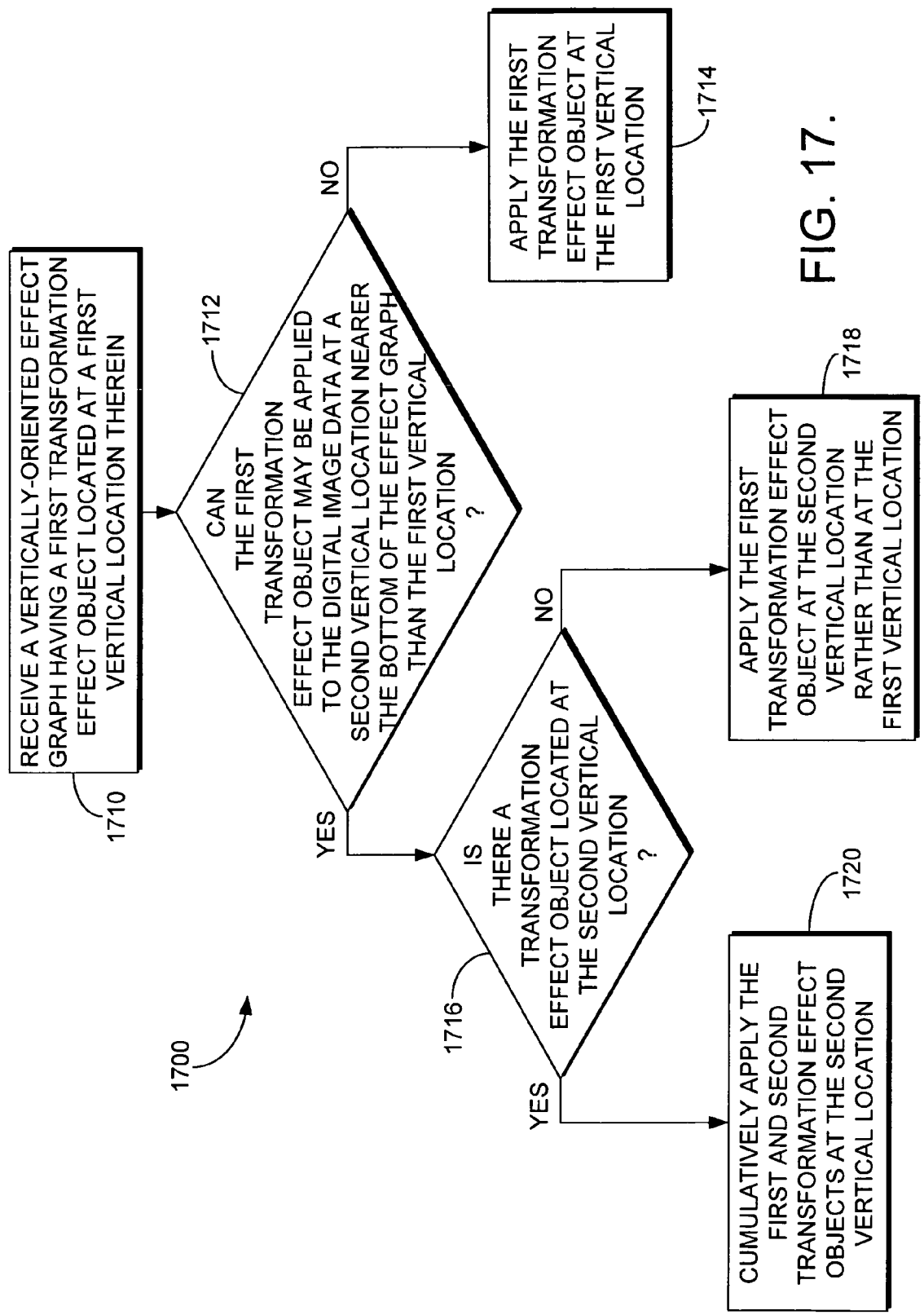
FIG. 17 is a flow diagram illustrating a method for processing digital image data utilizing a vertically-oriented Effect graph in accordance with an embodiment of the present invention.

With reference to FIG. 17, a flow diagram is illustrated which shows a method 1700 for processing digital image data utilizing a vertically-oriented Effect graph, the digital image data being processed from a bottom of the Effect graph to a top thereof, in accordance with an embodiment of the present invention. Initially, as indicated at block 1710, a vertically-oriented Effect graph is received, the Effect graph having a first transformation Effect object located at a first vertical location therein. Subsequently, as indicated at block 1712, it is determined whether the first transformation Effect object may be applied to the digital image data at a second vertical location nearer the bottom of the Effect graph than the first vertical location. If it is determined that the first transformation Effect object may not be applied to the digital image data at the second vertical location, the first transformation Effect object is applied at the first vertical location, as indicated at block 1714.

If, however, it is determined that the first transformation Effect object may be applied to the digital image data at the second vertical location, it is next determined whether there is a transformation Effect object located at the second vertical location. This is indicated at block 1716. If there is no transformation Effect object located at the second vertical location, the first transformation Effect object is applied at the second vertical location rather than the first vertical location, as indicated at block 1718. If, however, it is determined that there is a transformation Effect object located at the second vertical location, the first and second transformation Effect objects are cumulatively applied at the second vertical location, as indicated at block 1720.

Figure 18:
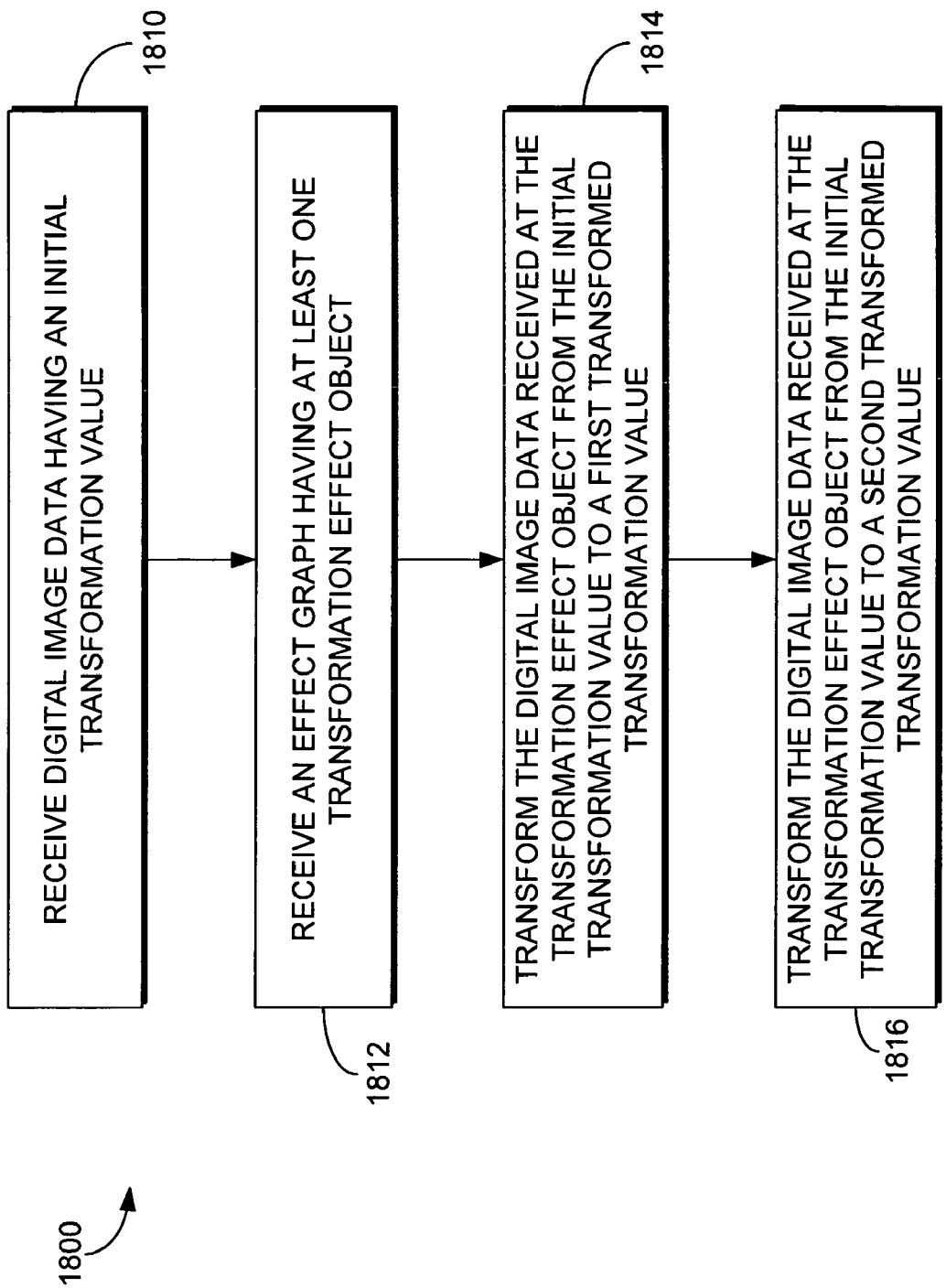
FIG. 18 is a flow diagram illustrating a method for processing digital image data utilizing a vertically-oriented Effect graph in accordance with an embodiment of the present invention.

Turning now to FIG. 18, a flow diagram is illustrated which shows a method 1800 for processing digital image data utilizing a vertically-oriented Effect graph, in accordance with an embodiment of the present invention. Initially, as indicated at block 1810, digital image data having an initial transformation value is received. Subsequently or simultaneously, an Effect graph having at least one transformation Effect object is received, as indicated at block 1812. Next, the digital image data received is transformed at the transformation Effect object from the initial transformation value to a first transformed transformation value, as indicated at block 1814. Subsequently, the digital image data is transformed at the transformation Effect object from the initial transformation value to a second transformed transformation value, as indicated at block 1816.

In view of the above, an embodiment of the present invention is directed to a system for editing digital image data. The system includes a Graphic Processing Unit (GPU) having GPU memory associated therewith, and an editing component for non-destructively editing at least a portion of the digital image data utilizing the GPU memory. In one embodiment, the editing component is capable of non-destructively editing at least a portion of the digital image data received utilizing one of the GPU memory and a combination of the GPU memory and the CPU memory.

The system may further include an Effect graph receiving component for receiving a plurality of Effect objects that are wired together to form an Effect graph, the Effect graph being capable of being utilized for editing the digital image data. Additionally, the system may further comprise a data receiving component for receiving the digital image data to be edited.

In another embodiment, the present invention is directed to a method for processing digital image data utilizing an Effect graph. The method includes receiving a plurality of Effect objects and wiring at least a portion of the plurality of Effect objects together into the Effect graph, wherein the Effect graph is capable of being wired utilizing at least one of CPU memory and GPU memory. In one embodiment, processing the digital image data received may include non-destructively processing at least a portion of the digital image data. The method may further comprise receiving digital image data to be processed and/or processing the digital image data received utilizing the Effect graph, as desired. Still further, the method may include storing the digital image data in association with an image buffer in at least one of the CPU memory and the GPU memory.

In an additional embodiment, the present invention is directed to a system for processing digital image data. The system includes a data receiving component for receiving digital image data to be processed, an Effect graph obtaining component for obtaining an Effect graph to be utilized in processing the digital image data received, the Effect graph including a plurality of Effect objects, and a processing component for processing the digital image data utilizing the Effect graph and at least one of CPU memory and GPU memory. In one embodiment, the Effect graph obtaining component may be capable of wiring at least a portion of the plurality of Effect objects together to create the Effect graph. In another embodiment, the processing component is capable of non-destructively processing at least a portion of the digital image data utilizing the Effect graph and at least one of the GPU memory and a combination of the GPU memory and the CPU memory. If desired, the system may further include a storage component for storing the digital image data in at last one of the CPU memory and the GPU memory.

In an additional embodiment, the present invention relates to a method for processing digital image data utilizing a vertically-oriented Effect graph, the digital image data being processed from a bottom of the Effect graph to a top of the Effect graph. The method includes receiving the vertically-oriented Effect graph, wherein the Effect graph includes an Effect object located at a junction initiating two divergent paths, receiving digital image data to be processed utilizing the Effect graph, performing a first processing pass of the Effect graph from the bottom to the top thereof along a first of the two divergent paths, and caching at least a portion of the digital image data in an image buffer associated with the output of the Effect object during processing.

In another embodiment, the present invention is directed to a method for processing digital image data utilizing a vertically-oriented Effect graph, the digital image data being processed from a bottom of the Effect graph to a top of the Effect graph. The method includes receiving the vertically-oriented Effect graph, wherein the Effect graph includes at least a first Effect object and a second Effect object, the second Effect object being nearer the top of the Effect graph than the first Effect object, receiving digital image data to be processed utilizing the Effect graph, performing a first processing pass of at least a portion of the Effect graph that includes the first and second Effect objects, and caching at least a portion of the digital image data in an image buffer associated with the output of the first Effect object. The method may further comprise detecting user modification in association with the second Effect object.

In another embodiment, the present invention is directed to a system for processing digital image data utilizing a vertically-oriented Effect graph, the digital image data being processed from a bottom of the Effect graph to a top of the Effect graph. The system includes a first receiving component for receiving the vertically-oriented Effect graph, wherein the Effect graph includes an Effect object located at a junction initiating two divergent paths. The system further includes a second receiving component for receiving digital image data to be processed utilizing the Effect graph, a first processing component for performing a processing pass of the Effect graph from the bottom to the top thereof, a caching component for caching at least a portion of the digital image data in a buffer associated with the output of the Effect object during processing, and a second processing component for performing a second processing pass of the Effect graph in accordance with one of the two divergent paths, wherein the second processing pass extends from the image buffer associated with the output of the Effect object.

In another embodiment, the present invention relates to a method for processing digital image data utilizing an Effect graph. The method includes receiving the Effect graph, wherein the Effect graph includes a plurality of Effect objects each having an image buffer associated therewith for storing digital image data, receiving digital image data to be processed utilizing the Effect graph, and performing a pre-rendering pass of the Effect graph prior to processing the digital image data.

In yet another embodiment, the present invention relate to a method for processing digital image data utilizing an Effect graph. The method includes receiving the Effect graph, wherein the Effect graph received includes a plurality of Effect objects each having an image buffer associated therewith for storing digital image data, receiving digital image data to be processed utilizing the Effect graph, and determining if sufficient memory is available in a Graphics Processing Unit (GPU) associated with the Effect graph to process the digital image data.

Still further, an embodiment of the present invention relates to a method for processing digital image data utilizing an Effect graph. The method includes receiving the Effect graph, wherein the Effect graph includes a plurality of Effect objects each having an image buffer associated therewith for storing digital image data, receiving digital image data to be processed utilizing the Effect graph, and determining if one or more of the image buffers associated with the plurality of Effect objects is to be cached during processing of the digital image data.

In another embodiment, the present invention relates to a method for creating an Effect graph for processing of digital image data. The method includes providing one or more Effect Layers, each Effect Layer having a logical Effect sub-graph associated therewith that includes a plurality logical Effects, receiving input regarding processing of the digital image data, determining the impact the input received is to have on each logical Effect upon processing of the digital image data, and creating a physical Effect sub-graph in accordance with the determined impact.

In yet another embodiment, the present invention relates to a method for processing digital image data utilizing an Effect graph. The method includes receiving the Effect graph, the Effect graph having at least one mask Effect object associated with an Effect Layer, receiving digital image data, receiving input regarding selection of at least a portion of the digital image data that satisfies a criteria, and applying the at least one mask Effect object to the digital image data received.

In still another embodiment, the present invention relates to a system for processing digital image data. The system includes a providing component for providing one or more Effect Layers, each Effect Layer having a logical Effect sub-graph associated therewith that includes three or more logical Effects, a transforming component for transforming the logical Effect sub-graph into a physical Effect sub-graph in accordance with an impact each of the logical Effects is to have upon processing of the digital image data, and a rendering component for rendering an image utilizing the physical Effect sub-graph. The system may further comprise a converting component for converting the extracted digital image data into an analytical result and/or a forwarding component for forwarding the analytical result to the main Effect, if desired.

In yet another embodiment, the present invention relates to a method for processing digital image data utilizing a vertically-oriented Effect graph, the digital image data being processed from a bottom of the Effect graph to a top thereof. The method includes receiving the vertically-oriented Effect graph, the Effect graph having a first transformation Effect object located at a first vertical location therein and determining whether the first transformation Effect object may be applied to the digital image data at a second vertical location, the second vertical location being nearer the bottom of the Effect graph than the first vertical location. If it is determined that the first transformation Effect object may be applied to the digital image data at the second vertical location, the method further may further include applying the first transformation object at the second vertical location rather than at the first vertical location. If, however, it is determined that the first transformation Effect object may not be applied to the digital image data at the second vertical location, the method may further include applying the first transformation Effect object at the first vertical location.

In an additional embodiment, the present invention relates to a system for processing digital image data utilizing a vertically-oriented Effect graph. The system includes a receiving component for receiving the vertically-oriented Effect graph, the Effect graph having a first transformation Effect object located at a first vertical location therein, a determining component for determining whether the first transformation Effect object may be applied to the digital image data at a second vertical location, the second vertical location being nearer the bottom of the Effect graph than the first vertical location, and an applying component for applying the first transformation Effect object at the second vertical location rather than at the first vertical location if it is determined that the first transformation Effect object may be applied at the second vertical location.

In a further embodiment, the present invention relates to a method for processing digital image data utilizing a vertically-oriented Effect graph. The method includes receiving digital image data having an initial transformation value, receiving the Effect graph, the Effect graph having at least one transformation Effect object, transforming the digital image data received at the at least one transformation Effect object from the initial transformation value to a first transformed transformation value, and transforming the digital image data received at the at least one transformation Effect object from the initial transformation value to a second transformed transformation value.

Embodiments of the present invention further relate to one or more computer readable media having computer-executable instructions for performing the methods herein described, as well as computers programmed to perform the methods.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer system for editing digital image data, comprising:
   a Graphics Processing Unit (GPU) having GPU memory associated therewith;
   a Central Processing Unit (CPU) having CPU memory associated therewith, wherein the GPU is integrated with the CPU into a digital image processing model architecture, as opposed to being provided peripherally, such that the CPU and the GPU operate interchangeably to non-destructively edit a portion of the digital image data; and
   a processing unit coupled to a computer storage medium, the computer storage medium having stored thereon a plurality of computer software components executable by the processing unit, the computer software components comprising:
   an editing component for non-destructively editing the portion of the digital image data and for determining whether to utilize the CPU, the GPU, or a combination thereof to non-destructively edit, wherein non-destructively editing comprises:
     (1) detecting a request to render the digital image data;
     (2) loading unaltered the portion of the digital image data as originally loaded into the GPU memory at the time of the request, wherein the portion of the digital image data is selected on-demand according to the request; and
     (3) rendering an image by processing the portion of the digital image data without flattening or saving the image data to intermediate steps,
   wherein determining whether to utilize the CPU, the GPU, or a combination thereof comprises:
     (1) determining if a software-render-only override is associated with an Effect object of an effect graph;
     (2) determining if a dynamic condition exists that influences which rendering method is called;
     (3) when a software-render-only override or a dynamic condition is identified, calling the CPU to assist with the non-destructive edit; and
     (4) automatically passing a processed portion of the digital image data from the GPU to the CPU in accordance with processing capabilities of the CPU and to the GPU, respectively, such that the CPU and the GPU operate in cooperation.

2. The system of claim 1, further comprising an Effect graph receiving component for receiving a plurality of Effect objects that are wired together to form an Effect graph, wherein the Effect graph is capable of being utilized for editing the digital image data.

3. The system of claim 1, further comprising a data receiving component for receiving the digital image data to be edited, the digital image data comprising the portion of the digital image data as originally loaded.

4. The system of claim 3, wherein the editing component is capable of non-destructively editing the portion of the digital image data received utilizing one of the GPU memory, the CPU memory, and a combination of the GPU memory and the CPU memory, wherein the combination of the GPU memory and the CPU memory being utilized upon a determination that sufficient GPU memory is unavailable in association with non-destructively editing the digital image data at one or more Effect objects of the effect graph, otherwise, the CPU memory being utilized to assist with non-destructively editing.

5. A method for processing digital image data utilizing an Effect graph, the method comprising:
   receiving a plurality of Effect objects;
   accessing a digital image processing model architecture to determine whether to utilize at least one of Central Processing Unit (CPU) memory and Graphics Processing Unit (GPU) memory;
   wherein determining whether to utilize the CPU, the GPU, or a combination thereof comprises:
   (1) determining if a software-render-only override is associated with said Effect object of said effect graph;
   (2) determining if a dynamic condition exists that influences which rendering method is called;
   (3) when a software-render-only override or a dynamic condition is identified, calling the CPU to assist with the non-destructively edit; and
   (4) automatically passing a processed portion of the digital image data from the GPU to the CPU in accordance with processing capabilities of the CPU and to the GPU, respectively, such that the CPU and the GPU operate in cooperation;
   wherein said digital image processing model architecture comprises said CPU and said GPU with said CPU having CPU memory associated therewith and said GPU having GPU memory associated therewith; and
   wherein said accessing of the digital image processing model architecture to determine whether to utilize at least one of Central Processing Unit (CPU) memory and Graphics Processing Unit (GPU) memory further comprises;
   evaluating whether sufficient capacity is available in the GPU memory for creating the Effect graph;
   when sufficient memory is not available in the GPU memory, utilizing the CPU memory to support the GPU memory in creating the Effect graph;
   utilizing portions of the GPU memory and the CPU memory to create the Effect graph according to processing capabilities of the CPU and to the GPU, respectively, such that the CPU and the GPU operate in cooperation; and
   creating an Effect graph by wiring at least a portion of the plurality of Effect objects together,
   wherein each of the plurality of Effect objects that are wired together add particular functionality to the Effect graph by acting as pixel operators;
   wherein the Effect graph processes the digital image data by modifying image pixel data therein in a data flow directed by the wiring,
   wherein the Effect graph is capable of being created utilizing the digital image processing model architecture, wherein the GPU is integrated with the CPU, as opposed to being provided peripherally, such that the CPU and the GPU operate interchangeably to non-destructively edit a portion of the digital image data.

6. The method of claim 5, further comprising receiving digital image data to be processed.

7. The method of claim 6, further comprising processing the digital image data received utilizing the Effect graph having an acyclic path.

8. The method of claim 7, wherein processing the digital image data received comprises non-destructively processing at least a portion of the digital image data received, wherein non-destructively editing comprises:
   detecting a request to render the digital image data;
   loading unaltered the portion of the digital image data as originally loaded into the GPU memory at the time of the request, wherein the portion of the digital image data is selected on-demand according to the request; and
   rendering an image by processing the portion of the digital image data without flattening or saving the image data to intermediate steps.

9. The method of claim 5, wherein each of the plurality of Effect objects is associated with an image buffer, and wherein the method further comprises storing the digital image data in at least one of the CPU memory and the GPU memory in association with at least one of the image buffers.

10. The method of claim 9, wherein the CPU memory is associated with a CPU and the GPU memory is associated with a GPU, and wherein each image buffer is capable of being passed between the GPU and the CPU automatically and without user intervention.

11. The method of claim 9, wherein each image buffer is capable of being automatically converted from storing a first form of pixel data to a second form of pixel data without user intervention.

12. One or more computer storage media having computer-executable instructions for performing the method of claim 5.

13. A computer programmed to perform the method of claim 5.

14. A system for processing digital image data, the system comprising:
   a data receiving component for receiving digital image data to be processed, wherein the digital image data comprises a portion of the digital image data as originally loaded into the GPU memory;
   a Graphics Processing Unit (GPU) having GPU memory associated therewith; and a Central Processing Unit (CPU) having CPU memory associated therewith, wherein the GPU is integrated with the CPU into a digital image processing model architecture, as opposed to being provided peripherally, such that the CPU and the GPU operate interchangeably to non-destructively edit a portion of the digital image data; wherein the GPU is integrated with the CPU, as opposed to being provided peripherally, such that the CPU and the GPU operate interchangeably to non-destructively edit a portion of the digital image data;
   an Effect graph obtaining component for obtaining an Effect graph to be utilized in processing the digital image data received, the Effect graph including a plurality of Effect objects; and a processing component for processing the digital image data utilizing the Effect graph and a digital image processing model architecture that manages components including at least one of Central Processing Unit (CPU) memory and Graphics Processing Unit (GPU) memory, wherein the digital image processing model architecture is configured to determine whether to utilize the CPU memory, the GPU memory, or a combination thereof to non-destructively edit the digital image data by implementing the process comprising:

(1) determining if a software-render-only override is associated with an Effect object of an effect graph;

(2) determining if a dynamic condition exists that influences which rendering method is called; and (3) when a software-render-only override or a dynamic condition is identified, calling the CPU to assist with the non-destructively edit; and (4) automatically passing a processed portion of the digital image data from the GPU to the CPU in accordance with processing capabilities of the CPU and to the GPU, respectively, such that the CPU and the GPU operate in cooperation.

15. The system of claim 14, wherein the Effect graph obtaining component is capable of wiring at least a portion of the plurality of Effect objects together to create the Effect graph such that, upon execution, the Effect graph renders a user-identified resultant image.

16. The system of claim 14, wherein the processing component is capable of non-destructively processing at least a portion of the digital image data utilizing the Effect graph and a combination of the GPU memory and the CPU memory, wherein the combination of the GPU memory and the CPU memory being utilized upon a determination by the digital image processing model architecture of whether sufficient memory GPU is available in association with editing the digital image data, wherein non-destructively processing comprises:

detecting a request to render the digital image data;

loading unaltered the portion of the digital image data as originally loaded into the GPU memory at the time of the request, wherein the portion of the digital image data is selected on-demand according to the request; and rendering an image by processing the portion of the digital image data without flattening or saving the image data to intermediate steps.

17. The system of claim 14, wherein each of the plurality of Effect objects is associated with an image buffer, and wherein the system further comprises a storage component for storing the digital image data in at least one of the CPU memory and the GPU memory.

18. The system of claim 17, wherein the CPU memory is associated with a CPU and the GPU memory is associated with a GPU, and wherein each image buffer is capable of being passed between the GPU and the CPU automatically and without user intervention.

19. The system of claim 18, wherein each image buffer is capable of being automatically converted from storing a first form of pixel data to a second form of pixel data without user intervention.

* * * * *